(12) United States Patent
Bowser et al.

(10) Patent No.: US 7,680,706 B2
(45) Date of Patent: Mar. 16, 2010

(54) AUTOMOTIVE CORE FULFILLMENT SYSTEM AND METHOD

(75) Inventors: Jack A. Bowser, Wakefield, RI (US); Christopher William Sneed, Worcester, MA (US); Brian Richard Maday, Warwick, RI (US)

(73) Assignee: Rebuilders Automotive Supply, Coventry, RI (US)

( * ) Notice: Subject to any disclaimer, the term of this patent is extended or adjusted under 35 U.S.C. 154(b) by 8 days.

(21) Appl. No.: 12/017,767

(22) Filed: Jan. 22, 2008

(65) Prior Publication Data

US 2008/0183600 A1    Jul. 31, 2008

Related U.S. Application Data

(60) Provisional application No. 60/881,524, filed on Jan. 22, 2007.

(51) Int. Cl.
*G06Q 10/00* (2006.01)
*G06F 17/50* (2006.01)
*A01K 5/02* (2006.01)

(52) U.S. Cl. .................................. 705/28; 705/29

(58) Field of Classification Search ............... 705/28, 705/29
See application file for complete search history.

(56) References Cited

U.S. PATENT DOCUMENTS

| | | | |
|---|---|---|---|
| 4,037,302 A * | 7/1977 | Hollander | 29/403.3 |
| 4,905,363 A | 3/1990 | Boyenval | |
| 5,965,858 A | 10/1999 | Suzuki et al. | |

(Continued)

FOREIGN PATENT DOCUMENTS

DE    10214834    10/2003

(Continued)

OTHER PUBLICATIONS

Brian K. Thorn et al., "Take it Back: Remanufacturing Is a Viable Alternative to Disposal of Products that have Outlived Their Usefulness-But Only If Engineers Can Unearth Sound Economic Justifications (Manufacturing Industry Recycling)", Apr. 2002, vol. 34, ISSN: 1085-1259.

(Continued)

*Primary Examiner*—Matthew S Gart
*Assistant Examiner*—Harshad Parikh
(74) *Attorney, Agent, or Firm*—J.A. Lindeman & Co., PLLC

(57) ABSTRACT

A system and method for facilitating acquisition of automotive core parts from automotive recyclers for remanufacture includes identifying automotive cores and determining the value of the cores with a core fulfillment system. The core fulfillment system includes an interchange database with automotive core descriptions and corresponding interchange identification indicators. The system includes a core supplier database that includes automotive core descriptions with corresponding core supplier identification indicators and an interchange number matching module that equates database entries in the interchange database with database entries in the core supplier database. An interface module provides access to the core fulfillment system, accepts vehicle information, and provides demand and pricing information regarding automotive cores. Vehicle information is received and compared to automotive core descriptions, automotive interchange numbers, and core supplier identification indicators that correspond to the vehicle identification information. Automotive cores are identified based upon the comparison, and a core value is determined.

20 Claims, 22 Drawing Sheets

U.S. PATENT DOCUMENTS

| | | | |
|---|---|---|---|
| 6,633,795 | B1 | 10/2003 | Suzuki et al. |
| 6,732,417 | B2 | 5/2004 | Kaburagi et al. |
| 7,013,101 | B2* | 3/2006 | Maruyama et al. .......... 399/109 |
| 7,054,824 | B1* | 5/2006 | Grenchus et al. ............... 705/7 |
| 7,251,611 | B2* | 7/2007 | Abbott et al. .................. 705/7 |
| 2002/0007289 | A1* | 1/2002 | Malin et al. .................... 705/4 |
| 2002/0069137 | A1 | 6/2002 | Hiroshige et al. |
| 2002/0123918 | A1* | 9/2002 | Brown et al. ................... 705/7 |
| 2002/0161906 | A1* | 10/2002 | Teraura ...................... 709/230 |
| 2003/0050843 | A1* | 3/2003 | Onoue .......................... 705/20 |
| 2004/0167833 | A1* | 8/2004 | Schickler ..................... 705/28 |
| 2005/0049944 | A1* | 3/2005 | Chernoff et al. .............. 705/28 |
| 2005/0125261 | A1* | 6/2005 | Adegan ......................... 705/4 |
| 2006/0195384 | A1* | 8/2006 | Bauer et al. ................... 705/37 |
| 2008/0082427 | A1* | 4/2008 | Gandhi et al. ................. 705/28 |
| 2008/0183600 | A1* | 7/2008 | Bowser et al. ................ 705/28 |

FOREIGN PATENT DOCUMENTS

| | | |
|---|---|---|
| JP | 2000053045 | 2/2000 |
| JP | 2002334224 | 11/2002 |
| JP | 2004216250 | 8/2004 |
| JP | 2004240534 | 8/2004 |
| JP | 2004362260 | 12/2004 |

OTHER PUBLICATIONS

GALE Group, "Auto Recyclers Embrace ADP Hollander's Newly Redesigned Powerlink; Next Generation of Business Management System Enhances Productivity with Intuitive New Workflow (Manufacturing Industry Recycling)", Business Wire, May 7, 2002, Michigan, USA.

Deanne Toto, Mining For Dollars: In Addition to Their Standard Parts Revenue, Auto Dismantlers Mine Automobiles for Hidden Value in the Form of Recoverable Nonferrous Scrap Metal, "Automotive Recycling Update". Sep. 1, 2003. Michigan, USA.

Max Kvidera, "End Of The Line: Discarded Cars are the Lifeblood for Schnitzer Steel Industries Subsidiary Pick-n-Pull," (Scrap Metals Supplement). Recycling Today. Jan. 1, 2006. Michigan, USA.

Lynn Novell, "Rebuilders Automotive Supply (RAS) has had a Single Focus for More Than 35 years: Purchase High-Quality Automotive Cores from Recyclers for Volume Sales to the Remanufacturing Aftermarket Industry," At a Glance. Apr. 2006.

* cited by examiner

242

240

244

246

| | | | |
|---|---|---|---|
| ☐ Caliper | Left Front, 4 cyl - cast# 5703 FRONT LSIDE | $0.00 | |
| ☐ Caliper | Left Front, 4 cyl - cast# 5719 FRONT LSIDE | $0.00 | |
| ☐ Caliper | Left Front, 6 cyl - cast# 17CL15VN FRONT LSIDE | $0.00 | |
| ☐ Caliper | Left Front, 6 cyl - cast# 17CL15VN FRONT LSIDE | $0.00 | 97a |
| ☑ Caliper | Left Rear, 4 cyl - CAST# 9CLP14S REAR LSIDE | $20.00 | 97b |
| ☑ Caliper | Left Rear, 4 cyl - CAST# 3403 REAR LSIDE | $20.00 | |
| ☐ Caliper | Left Rear, 6 cyl - CAST# 9CLP14S REAR LSIDE | $20.00 | |
| ☐ Caliper | Left Rear, 6 cyl - CAST# 3403 REAR LSIDE | $20.00 | |
| ☐ Caliper | Right Front, 4 cyl - cast# 5703 FRONT RSIDE | $0.00 | |
| ☐ Caliper | Right Front, 4 cyl - cast# 5719 FRONT RSIDE | $0.00 | |
| ☐ Caliper | Right Front, 6 cyl - cast# 17CL15VN FRONT RSIDE | $0.00 | |
| ☐ Caliper | Right Front, 6 cyl - cast# 17CL15VN FRONT RSIDE | $0.00 | 97c |
| ☑ Caliper | Right Rear, 4 cyl - CAST# 9CLP14S REAR RSIDE | $20.00 | 97d |
| ☑ Caliper | Right Rear, 4 cyl - CAST# 3403 REAR RSIDE | $20.00 | |
| ☐ Caliper | Right Rear, 6 cyl - CAST# 9CLP14S REAR RSIDE | $20.00 | |
| ☐ Caliper | Right Rear, 6 cyl - CAST# 3403 REAR RSIDE | $20.00 | 97e |
| ☑ Distributor | 4 cyl, Hitachi (LX & EX) - OE# 30100-PCA-003,30100PAAA01,30100PAAA02 | $10.00 | |
| ☐ Distributor | 4 cyl, Hitachi (LX & EX) - D4T96-07 | $5.00 | |
| ☐ Distributor | 4 cyl, Tec (DX) - OE#: 30100-PABA01 | $35.00 | |
| ☐ Distributor | 4 cyl, Tec (DX) - TD-91U - W/O COIL | $5.00 | |
| ☐ Distributor | 6 cyl | $0.00 | |
| ☐ Power Window Motor | Right Front, Cpe (2 Dr) | $8.00 | |
| ☐ Power Window Motor | Right Rear | $8.00 | 97f |
| ☑ Starter Motor | 4 cyl, AT | $15.00 | |
| ☐ Starter Motor | 4 cyl, MT | $2.00 | |
| ☐ Starter Motor | 6 cyl | $15.00 | |
| ☐ Steering Gear/Rack | Power Rack & Pinion, Cpe (2 Dr) | $0.00 | 97g |
| ☑ Steering Gear/Rack | Power Rack & Pinion, Sdn (4 Dr), 4 cyl | $30.00 | |
| ☐ Steering Gear/Rack | Power Rack & Pinion, Sdn (4 Dr), 6 cyl | $0.00 | |
| ☐ Water Pump | 2.3L (4 cyl) | $0.00 | |
| ☐ Water Pump | 3.0L (6 cyl) | $0.00 | |
| ☐ Wiper Motor, Windshield | | $0.00 | |

Check All   Uncheck All

Stock #   *VIN #   Dismantler   Notes
[testaccord]   [ ]   [cws]   [check oem numbers]

[Save Batch]

NOTE: Do not click the submit button more than once or re-fresh the page during processing. This will result in the creation of duplicate batches.

*VIN number must be 17 digits and is required for 2007 and later vehicles.

Invoice

RAS
1650 FLAT RIVER RD COVENTRY. RI 02816
Ph: 800-633-0162
Fx:

RASCorePro
1650 Flat River Road
Coventry, RI 02816
Ph: 1 800-633-0162
 401-822-3030
Fx: 401-828-8488

Date: 01/18/08    Invoice: RAS-001174    Total: $135.00

Invoice

| Batch: RAS-restaccord | 1998 Honda ACCORD | | $135.00 |
|---|---|---|---|
| 000000152092 | Right Rear, 4 cyl - CAST# 3403 REAR RSIDE | Caliper | $20.00 |
| 000000152091 | Right Rear, 4 cyl - CAST# 9CLP14S REAR RSIDE | Caliper | $20.00 |
| 000000152090 | Left Rear, 4 cyl - CAST# 3403 REAR LSIDE | Caliper | $20.00 |
| 000000152089 | Left Rear, 4 cyl - CAST# 9CLP14S REAR LSIDE | Caliper | $20.00 |
| 000000152093 | 4 cyl, Hitachi (LX & EX) - OE# 30100-PCA-003,30100PAAA01,30100PAAA02 | Distributor | $10.00 |
| 000000152094 | 4 cyl AT | Starter Motor | $15.00 |
| 000000152095 | Power Rack & Pinion, Sdn (4 Dr), 4 cyl | Steering Gear/Rack | $30.00 |

The vehicle part search questions and vehicle part description text appearing on this web site are
copyright © 2007 by Audatex North America, Inc. All rights reserved

Packing Slip

RAS
1650 FLAT RIVER RD COVENTRY, RI 02816
Ph: 800-633-0162
Fx:

RASCorePro
1650 Flat River Road
Coventry, RI 02816
Ph: 1 800-633-0162
    401-822-3030
Fx: 401-828-8488

Date: 01/18/08    Invoice: RAS-001174

Packing Slip

| Batch: RAS-testaccord | | 1998 Honda ACCORD | |
|---|---|---|---|
| 000000152092 | Right Rear, 4 cyl - CAST# 3403 REAR RSIDE | | Caliper |
| 000000152091 | Right Rear, 4 cyl - CAST# 9CLP14S REAR RSIDE | | Caliper |
| 000000152090 | Left Rear, 4 cyl - CAST# 3403 REAR LSIDE | | Caliper |
| 000000152089 | Left Rear, 4 cyl - CAST# 9CLP14S REAR LSIDE | | Caliper |
| 000000152093 | 4 cyl, Hitachi (LX & EX) - OE# 30100-PCA-003,30100PAAA01,30100PAAA02 | | Distributor |
| 000000152094 | 4 cyl, AT | | Starter Motor |
| 000000152095 | Power Rack & Pinion, Sdn (4 Dr), 4 cyl | | Steering Gear/Rack |

The vehicle part search questions and vehicle part description text appearing on this web site are
copyright © 2007 by Audatex North America, Inc. All rights reserved

DON'T CRUSH YOUR CASH

*core evaluation service*

Home   About RAS   F.A.Q.   Contact Us   CorePro Manual   Shipping Requirements
DEMO1@CORESUPPLY.COM | Logout Start | Search by Vehicle | Search by Hollander | In Progress | RAS Bin | Invoices | Memos Documents on this site require Acrobat Reader.
Click here to download.

12/07/07          New Feature

Memo: A new feature has been added to Search by Hollander look up. You can now add up to 10 shelf stock numbers for each Hollander number. Under the Search by Hollander look up, choose the product line and add the Hollander minus the prefix. In some cases for calipers, you will need to add Left(L) or Right (R). If you look up a caliper without the L or R and nothing shows up, add the L or R to the end of the Hollander number. If there is still no price, that item is not on our buy list. After entering the Hollander number add the stock numbers below. Please feel free to call your Salvage Sourcing Rep with any questions. The staff of RAS would like to wish all of you a Happy and Safe Holiday season.                    ← 152a

07/23/07          Invoices

Memo: Invoicing. Please make sure you do not invoice any batches until your RAS BIN is ready to be picked up. Please call your Salvage Sourcing Rep. with any questions. Thank you RAS staff.                                                                                    ← 152b

07/23/07          Deleting Batches

Memo: A new feature has been added to CORE PRO. This feature is in the IN PROGRESS page. If you need to delete the vehicle and parts just click on delete and the batch will be deleted from your account. Please feel free to call your Salvage Sourcing Rep. with any questions. Thank you RAS staff.                                    ← 152c

06/22/07          Steering Gears

Memo: Memo: We have noticed that there is a discrepancy in the pricing of Steering Gears with Hollander numbers 551-1692 and 551-1731. The correct price for these items will be $20.00. If you have already added these items to your bins please be assured that we will honor the previous prices as of today. Thank you for using Core Pro                                                                                            ← 152d

05/31/07          Electrical Products

Memo: We are working on part numbers for our electrical products. If you have a different oem number other than listed, please call your Salvage Sourcing Representative to have the number looked up. Thank You for using CORE PRO.

AUTOMOTIVE CORE FULFILLMENT SYSTEM AND METHOD

CROSS-REFERENCE TO RELATED APPLICATION

The present application claims the benefit of priority of U.S. Provisional Patent Application No. 60/881,524 entitled "Automotive Core Fulfillment System and Method" filed on Jan. 22, 2007. This provisional application is incorporated by reference in its entirety.

FIELD OF THE INVENTION

The present invention is directed to system and method for facilitating acquisition of automotive cores from the automotive recycling industry for remanufacture.

BACKGROUND OF THE INVENTION

Automotive recyclers such as salvage yards acquire used automotive parts, such as powertrain, chassis, and body parts of automobiles. Many of the mechanical parts from these vehicles are referred to in the salvage industry as "cores". Cores are typically extracted from automobiles that were purchased by the recyclers for the purpose of disassembling them to sell the cores. In other instances, cores may be acquired from manufacturers of the parts themselves, where a defect has been found in the manufactured part so that the part cannot be used unless remanufactured.

The automotive recyclers sell the extracted cores from automobiles to core suppliers that gather large quantities of a particular core for a particular vehicle. Core suppliers identify the purchased cores and then verify that the cores can be remanufactured or otherwise reconditioned. These gathered quantities of cores for a particular vehicle are then sold to remanufacturers who recondition these parts. For remanufacturers, receiving good, rebuildable cores in large quantities is important since remanufacturing of the cores often requires tooling and machining lines that must be set up for a particular core. Thus, remanufacturers typically prefer to purchase cores from core suppliers in bulk rather than from automotive recyclers one piece at a time.

The remanufacturers recondition or remanufacture these cores and then sell these remanufactured/reconditioned parts to wholesale or retail automotive part suppliers. Because these cores are reconditioned rather than being entirely manufactured, the remanufactured parts can be sold for less than the corresponding new parts.

Automotive recyclers use a standard parts identification system referred to as an interchange, such as the Hollander interchange, for example, to help identify parts from vehicles. Such interchange systems allow an automotive recycler to identify the make, model, and year range of most parts on a given vehicle, and to identify the parts using a proprietary alphanumeric identification system. In contrast, core suppliers and remanufacturers may utilize different identification numbers than the automotive recyclers. For example, core suppliers and remanufacturers may use Original Equipment Manufacturer (OEM) numbers, casting numbers, and remanufacturer-specific proprietary stock keeping unit (SKU) numbers. These numbers are very specific and do not have the same year make model breakdown availability that salvage industry interchanges have. The core supplier numbers are very specific whereas the salvage industry interchange numbers are very broad and may encompass many different numbers.

Efforts to date to improve the ability to cross reference core supplier numbers to salvage industry interchange numbers have been largely unsuccessful in providing a cost-effective manner of identifying specific cores sought by core suppliers. Additionally, core suppliers have not been able to satisfactorily characterize salvage yard inventories. Efforts aimed at improving the ability of the parties to accurately identify and supply the required parts have been extremely labor-intense and have not provided a satisfactory return on the amount of resources expended. What is needed is a system and a method for quickly and accurately determining salvage yard inventories and determining the value of a particular part from a particular automobile.

SUMMARY OF THE INVENTION

The above-described difference in automotive part identification systems and methods used has been found to be a significant problem for the salvage industry and for the core supplier industry, where most of the acquired cores are purchased from salvage facilities of automotive recyclers. In particular, automotive recyclers are unaware of demand and pricing of the specific cores being sought after by the core suppliers. In the present application, the term "cores" refers to mechanical and electrical automobile parts, which are to be rebuilt, refurbished, or otherwise reconditioned. For the purposes of this application, the term "cores" and automobile parts that are to be rebuilt, refurbished, or otherwise reconditioned are synonymous.

In addition, automotive recyclers do not have an efficient way to easily determine the value of a particular part from a particular automobile. Correspondingly, valuable labor may be expended by the automotive recycler in removing a part from an automobile, only to find that the core supplier is not willing to purchase the part due to a lack of demand, a sufficient or overabundant existing supply inventory, and the like. In addition, valuable labor may be expended by the automotive recycler in removing a part from an automobile, only to find that the value of the part offered for purchase by the core supplier is not enough to cover even the labor cost incurred for the removal of the part.

Conversely, the automotive recycler may choose not to remove a particular first part from an automobile in view of the labor costs involved, and instead, the automotive recycler removes other certain parts of the automobile in a separate dismantling facility. The automotive recycler then stores the dismantled automobile in the salvage yard. The automotive recycler may later find that there was sufficient demand for the first part so that a profit could have been made by removing the particular in-demand first part from the automobile when it was in the dismantling facility, where tools for removal are immediately available. However, removal of such first part may no longer be profitable because the automobile has been stored in the salvage yard and is no longer at the dismantling facility.

In both of the above described situations, the result is that the automotive recycler receives reduced profits, either by incurring unnecessarily increased labor costs, or by foregoing potential sales. The automotive core fulfillment system and method in accordance with the present invention addresses these problems to increase the automotive recycler's profits, as well as to provide the automotive recycler with a guaranteed and predetermined sales outlet for their inventory.

An automotive core fulfillment system in accordance with the present invention includes an interchange database that includes automotive core descriptions with corresponding interchange identification indicators. The system also includes a core supplier database that includes automotive core descriptions with corresponding core supplier identification indicators. The core supplier identification indicators may include original equipment manufacturer (OEM) part numbers or other core supplier numbers. The system also includes an interchange number matching module that equates a database entry in the interchange database with a database entry in the core supplier database. The system of the present invention may utilize Hollander numbers as the interchange identification indicators, or the system may use other interchange identification indicators, such as Lester numbers, and the like. The interchange number matching module matches interchange identification indicators with corresponding core supplier identification indicators.

Additionally, the automotive core fulfillment system of the present invention may include an interface module that provides access to the automotive core fulfillment system and accepts vehicle information and provides demand and pricing information regarding automotive cores. Further, the system of the present invention may utilize an on-site interface, or may include an interface module that provides remote access to the automotive core fulfillment system with a terminal or other communication device through a computer network or other communications network.

A method of the present invention identifies an automotive core and determines the value of the automotive core with a core fulfillment system. The method includes receiving vehicle identification information, comparing the vehicle identification information to automotive core descriptions and automotive interchange numbers and core supplier identification indicators that correspond to the vehicle identification information. The method also includes identifying the automotive core based upon the comparison of the vehicle identification information to automotive core descriptions and automotive interchange numbers and core supplier identification indicators, the automotive core including a part type identifier, a yard description, and a core value. Of course, all parts of an automobile may be identified, including all mechanical and electrical parts of the automobile, and the value of the part may be determined using the system and method of the present invention. For brevity, this application refers to such mechanical parts and electrical parts as "automotive cores" or simply "cores."

Additionally, the method of identifying an automotive core and determining the value of the automotive core includes determining a demand for the automotive core. The vehicle identification information may include the year the vehicle was manufactured, the make of the vehicle, and the model of the vehicle. Additional identification information may also be used, including engine type, engine displacement, transmission type, brake type, number of doors, and the like, to expand or restrict the search based upon the more specific or less specific type of vehicle.

Multiple cores may be identified using a list of vehicle identifiers, and the value of those cores may be determined simultaneously. The list of vehicle identifiers may be a manual list, a bar code or bar codes, an electronic VIN number or VIN numbers, or any other notation of multiple vehicle identifiers. With this vehicle identifier information, a core inventory value may be determined based upon an aggregate total of core values of identified automotive cores.

An alternative method of identifying an automotive core and determining the value of the automotive core with a core fulfillment system in accordance with the present invention includes receiving part type identification information, receiving an automotive interchange number, and comparing the part type identification information to automotive core descriptions and core supplier identification indicators that correspond to the vehicle identification information and the automotive interchange numbers. The results of this comparison are then used to identify the automotive core based upon the comparison of the part type identification information and automotive interchange number to automotive core descriptions and core supplier identification indicators. The identified automotive core may include a part type identifier, a yard description, and a core value. Additionally, the automotive core entry may include demand information for the automotive core.

DETAILED DESCRIPTION OF THE INVENTION

Figure 1:
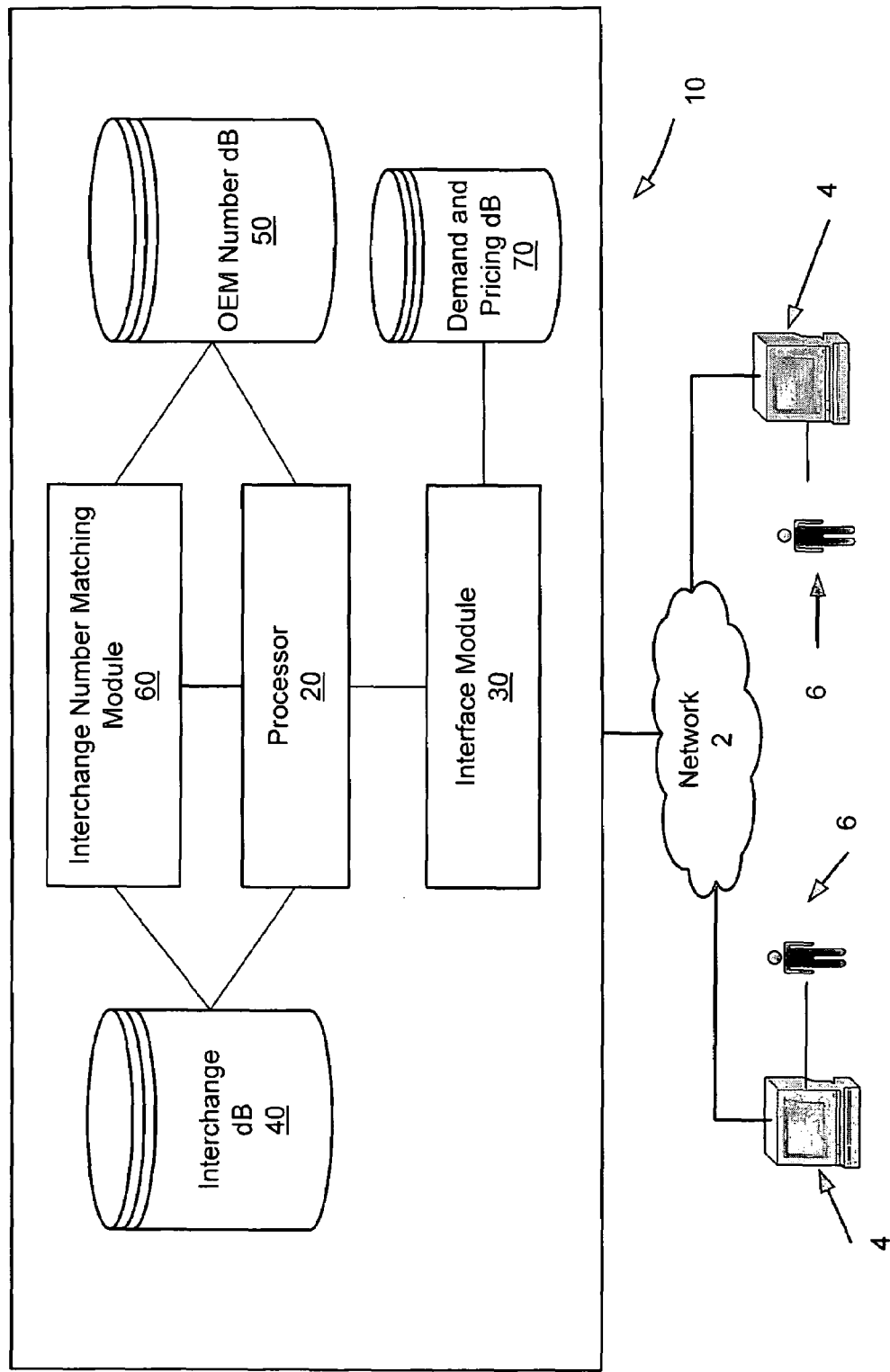
FIG. 1 is a schematic illustration of an automotive core fulfillment system in accordance with one embodiment of the present invention.

FIG. 1 is a schematic illustration of an automotive core fulfillment system 10 in accordance with one embodiment of the present invention. In accordance with the illustrated embodiment, the automotive core fulfillment system 10 is provided with a processor 20 that is adapted to control and facilitate functions of various modules and components of the automotive core fulfillment system 10 as described in detail below. It should be initially noted that the automotive core fulfillment system 10 of FIG. 1 may be implemented with any type of hardware and software, and may be a pre-programmed general purpose computing device. For example, the automotive core fulfillment system 10 may be implemented using a server, a personal computer, a portable computer, a thin terminal, a hand held device, a wireless device, or any combination of such devices. The automotive core fulfillment system 10 may be a single device at a single location or multiple devices at a single location, or multiple devices at multiple locations that are connected together using any appropriate communication protocols over any communication medium such as electric cable, fiber optic cable, any other cable, or in a wireless manner using radio frequency, infrared, or other technologies.

In the illustrated embodiment, the automotive core fulfillment system 10 is connected to a network 2 that allows remote access to the automotive core fulfillment system 10 so that vehicle information and interchange information can be entered, and so that demand and pricing information regarding automotive cores can be retrieved from the system. The network 2 allows the automotive core fulfillment system 10 to interact with remotely located terminals 4, which are utilized by automotive recyclers 6. The network 2 may be any type of communications channel, such as the Internet, a local area network (LAN), a wide area network (WAN), direct computer connections, and the like, and may be connected in a wireless manner using radio frequency, infrared, or other communication technologies, using any type of communication hardware and protocols. The terminals 4 may be implemented using a server, a personal computer, a portable computer, a thin terminal, a hand held device, a wireless device, and any other computing devices, or any combination of such devices.

It should also be noted that the automotive core fulfillment system 10 in accordance with one embodiment of the present invention is illustrated and discussed herein as having a plurality of modules and/or components that perform particular functions. It should be understood that these modules are merely schematically illustrated based on their function for clarity purposes only, and do not necessary represent specific hardware or software. In this regard, these modules and/or sub-modules may be implemented as hardware and/or software to substantially perform the particular functions explained. Moreover, two or more of these modules may be combined together within the automotive core fulfillment system 10, or divided into more modules based on the particular function desired. Thus, the present invention as schematically embodied in FIG. 1 should not be construed to limit the automotive core fulfillment system 10 of the present invention.

In the above regard, the automotive core fulfillment system 10 in accordance with the illustrated embodiment also includes an interface module 30 that allows the automotive recyclers 6 to easily enter a particular vehicle's information such as year, make and model, and retrieve demand and pricing information for the various automotive cores of the particular vehicle from the automotive core fulfillment system 10 via the terminals 4. Similarly, interface module 30 provides an input and output pathway from automotive recyclers 6 and core fulfillment system 10. In this regard, the interface module 30 includes a graphical user interface (GUI) for receiving vehicle information and other information input by automotive recyclers 6, and a GUI for displaying the demand and pricing information for the various automotive cores of the inputted vehicle.

Numerous databases are provided in the automotive core fulfillment system 10 in accordance with the illustrated embodiment. In particular, the automotive core fulfillment system 10 shown includes an internal interchange database 40, which includes automotive core descriptions and automotive recycler's interchange numbers for numerous vehicle makes, models, years, and the like. Other information regarding the automotive cores can be stored in the interchange database 40 as well such as corresponding core supplier's part numbers and/or other interchange numbers, as well as additional core information. The automotive core fulfillment system 10 shown also includes a core supplier database such as Original Equipment Manufacturer (OEM) number database 50, which includes automotive core descriptions and their corresponding OEM part numbers for numerous vehicle makes, models, and years, for example. Of course, other information regarding the automotive cores can be stored in OEM number database 50 as well.

In addition, the automotive core fulfillment system 10 in accordance with the illustrated embodiment of the present invention includes an interchange matching module 60 that allows matching of the recycler's interchange number stored in the interchange database 40 with a corresponding OEM number stored in the OEM number database 50. Thus, when the automotive recycler 6 enters various vehicle information or interchange information using the terminal 4, the automotive core fulfillment system 10 identifies the various automotive cores and their corresponding recycler's interchange numbers in the interchange database 40, and matches these interchange numbers with the corresponding OEM numbers stored in the OEM number database 50. In this regard, the data that is stored in the interchange database 40 and the OEM numbers database 50 is updated periodically to include new vehicle models and corresponding part numbers for the cores. Therefore, the automotive core fulfillment system 10 greatly facilitates accurate identification of automotive cores between the automotive recycler and the core supplier and remanufacturer so that any transactions regarding the cores between these parties can be facilitated.

Furthermore, the automotive core fulfillment system 10 in accordance with the illustrated embodiment also includes a Demand and Pricing database 70, which includes demand information for particular cores that indicates whether there is an existing remanufacturer requesting particular cores for purchase. In addition, the Demand and Pricing database 70 also includes pricing information that identifies the price at which the particular cores will be purchased by the core supplier and/or by the remanufacturer from the automotive recycler 6. It is important to note that the pricing information is an offer for purchase price, and not an offer for sale price. The demand and pricing information is largely provided by the demands of the remanufacturers for the particular parts. Correspondingly, because the remanufacturers utilize OEM part numbers, the demand information and pricing information stored in the Demand and Pricing database 70 is correlated to the OEM parts. This information stored in the in Demand and Pricing database 70 is also updated periodically to include new demand and new pricing information as demand and prices change in the marketplace. With up-to-date demand and pricing information, automotive recyclers 6 and core suppliers can make informed decisions about transactions to which they are a party.

It should also be understood that the price for a particular core will typically differ between the core supplier and the (end-user) remanufacturer since the core supplier is in the business of aggregating large quantities of a particular core for the remanufacturers, and the core supplier will purchase the cores from a plurality of automotive recyclers, and then sell the aggregated quantity to the remanufacturers at a higher price to make some profit. Thus, in one application of the present invention in which the automotive core fulfillment system 10 is utilized by a core supplier, the Demand and Pricing database 70 includes the prices that the core supplier is willing to pay to the automotive recyclers for the cores. That is, the core value quoted is an offer to purchase price. When the core supplier's offer to purchase price is accepted by an automotive recycler, the core supplier makes a profit after covering the costs of aggregation and inspection of the cores and other services that the core supplier may provide. Of course, in other applications, for example where the automotive core fulfillment system 10 is utilized by a remanufacturer, the Demand and Pricing database 70 includes the prices that the remanufacturer is willing to pay directly to the automotive recyclers for the cores, or similarly, a price that the remanufacturer is willing to pay to a plurality of core suppliers.

The automotive core fulfillment system 10 in accordance with the present invention provides an output to the automotive recycler 6 that includes the "salvage value" for a particular vehicle input into the system 10. The output identifies those cores of the particular vehicle for which there is a demand, and an offer to purchase price can be identified to purchase the identified parts from the automotive recycler.

Figure 2A:
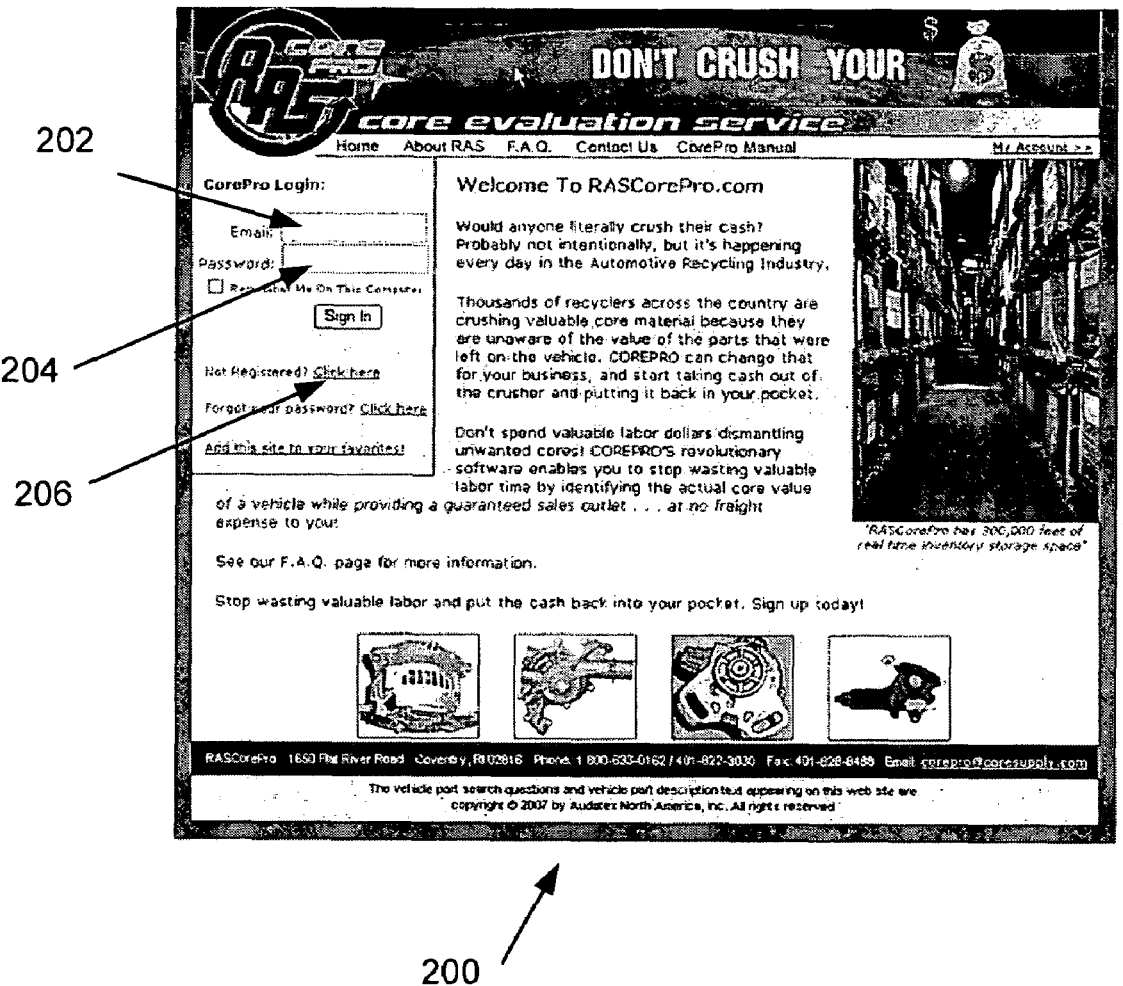
FIGS. 2A-2W shows example user interface screens generated by the automotive core fulfillment system of FIG. 1 as an automotive recycler accesses core fulfillment information in accordance with one embodiment of the present invention.
Figure 2B:
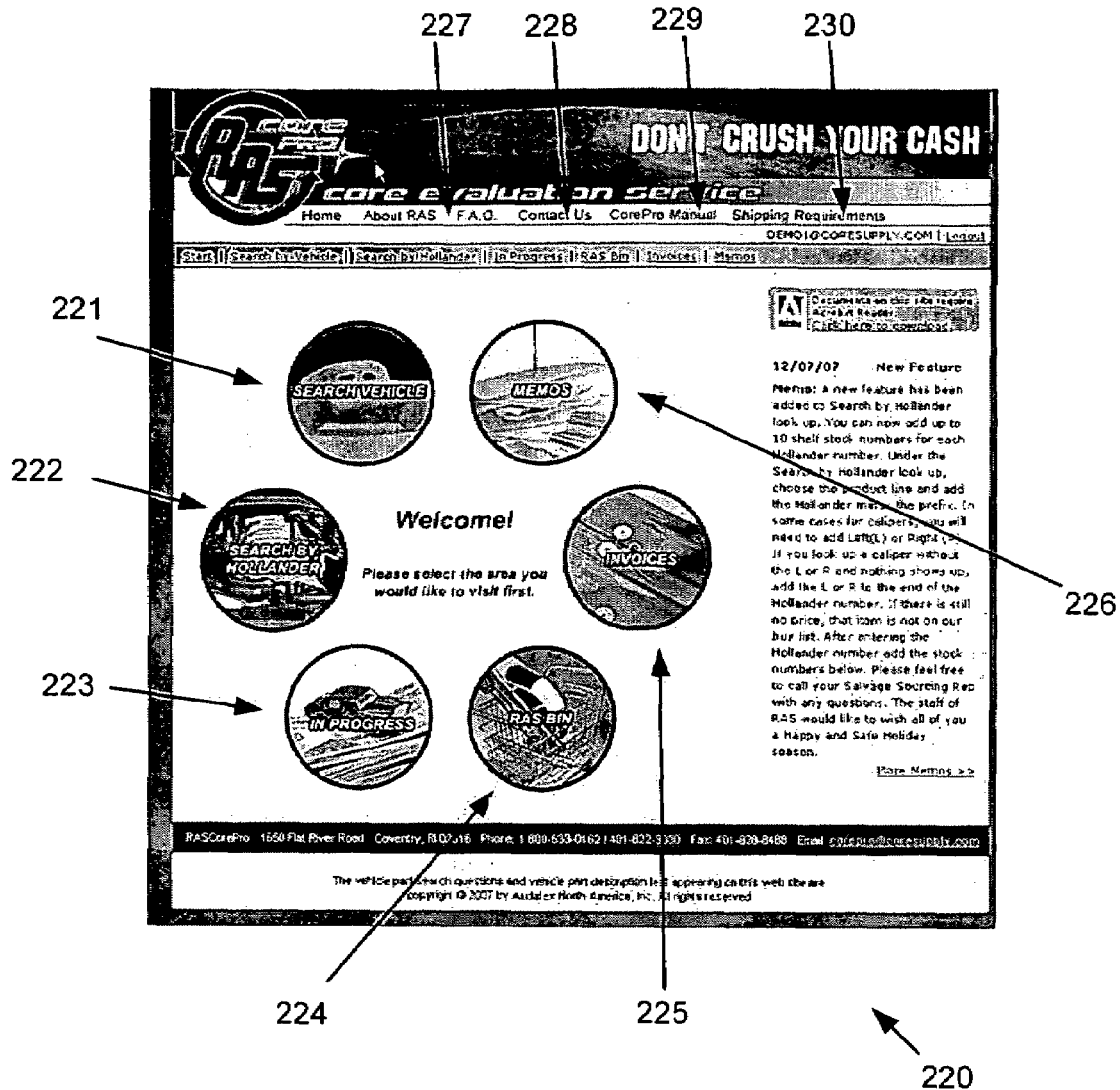
Figure 2C:
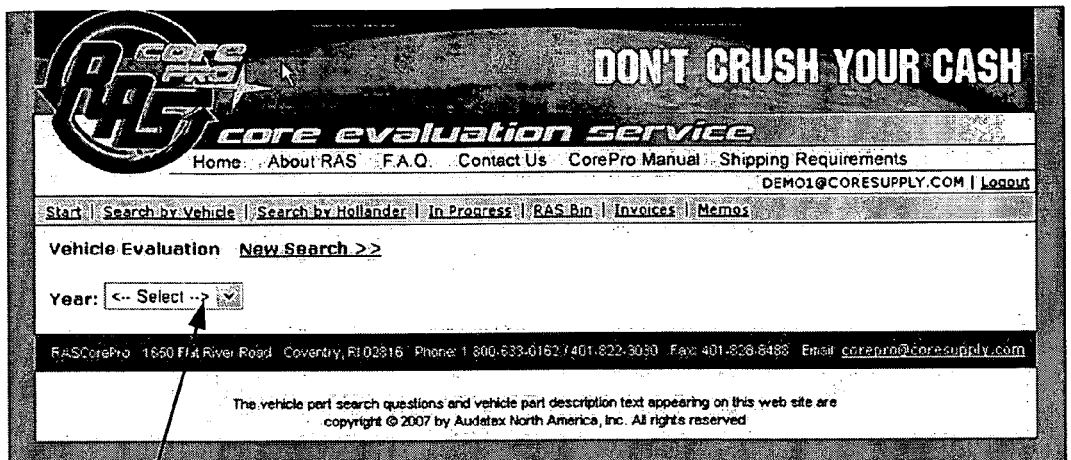
Figure 2D:
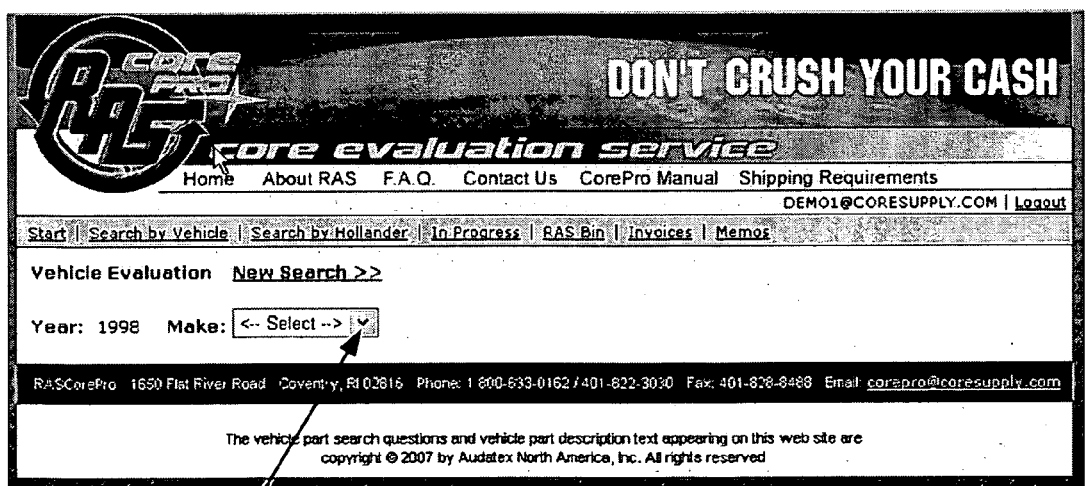
Figure 2E:
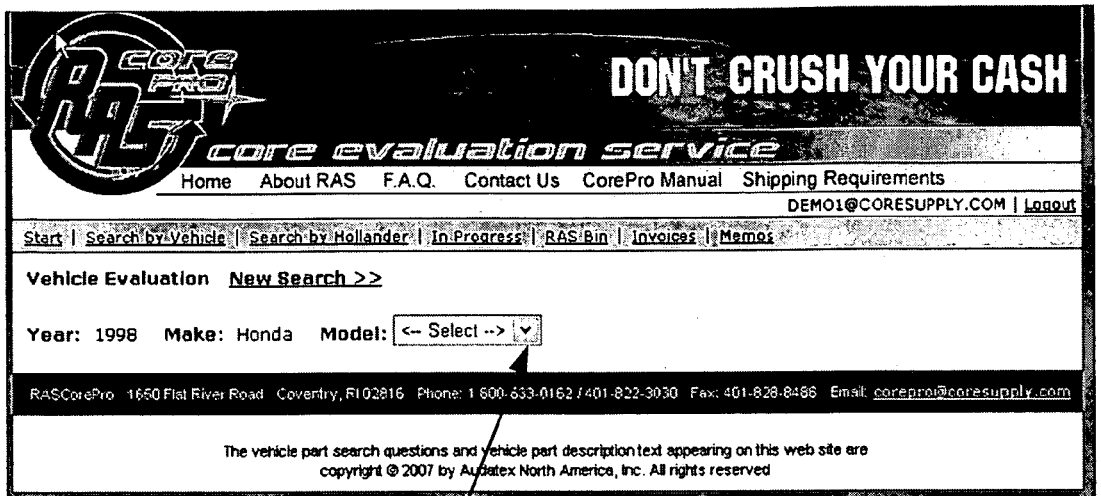
Figure 2F:
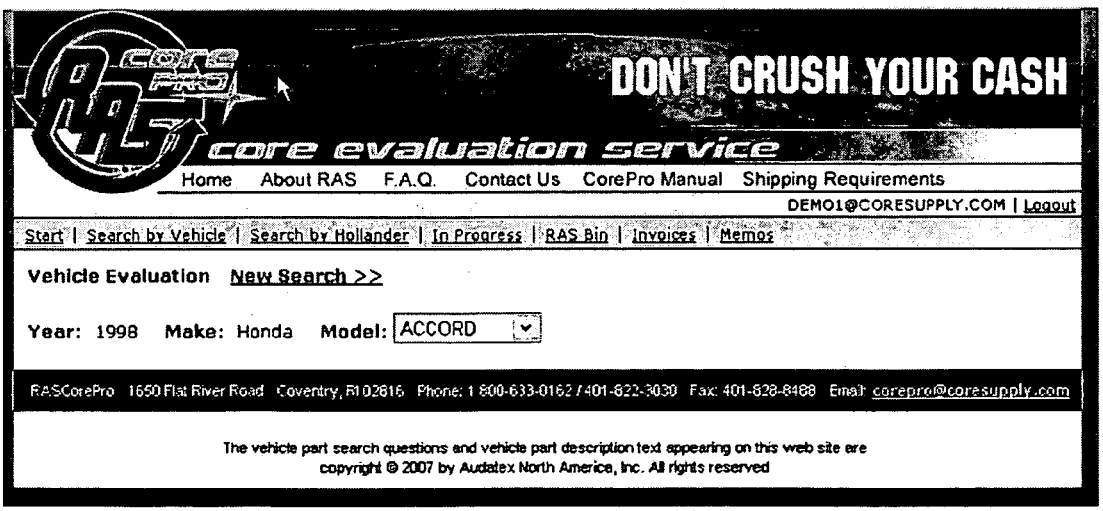
Figure 2G:
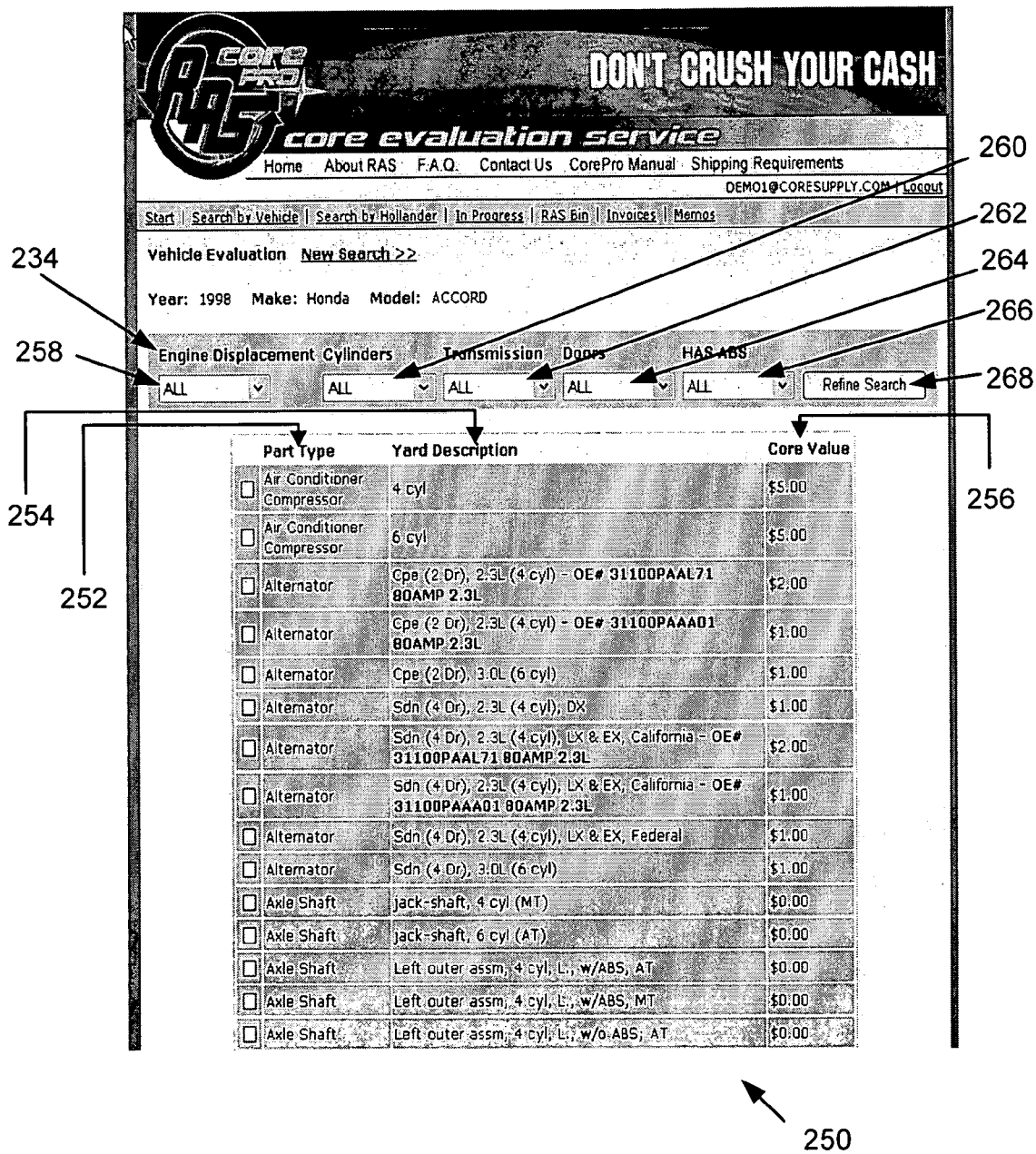
Figure 21:
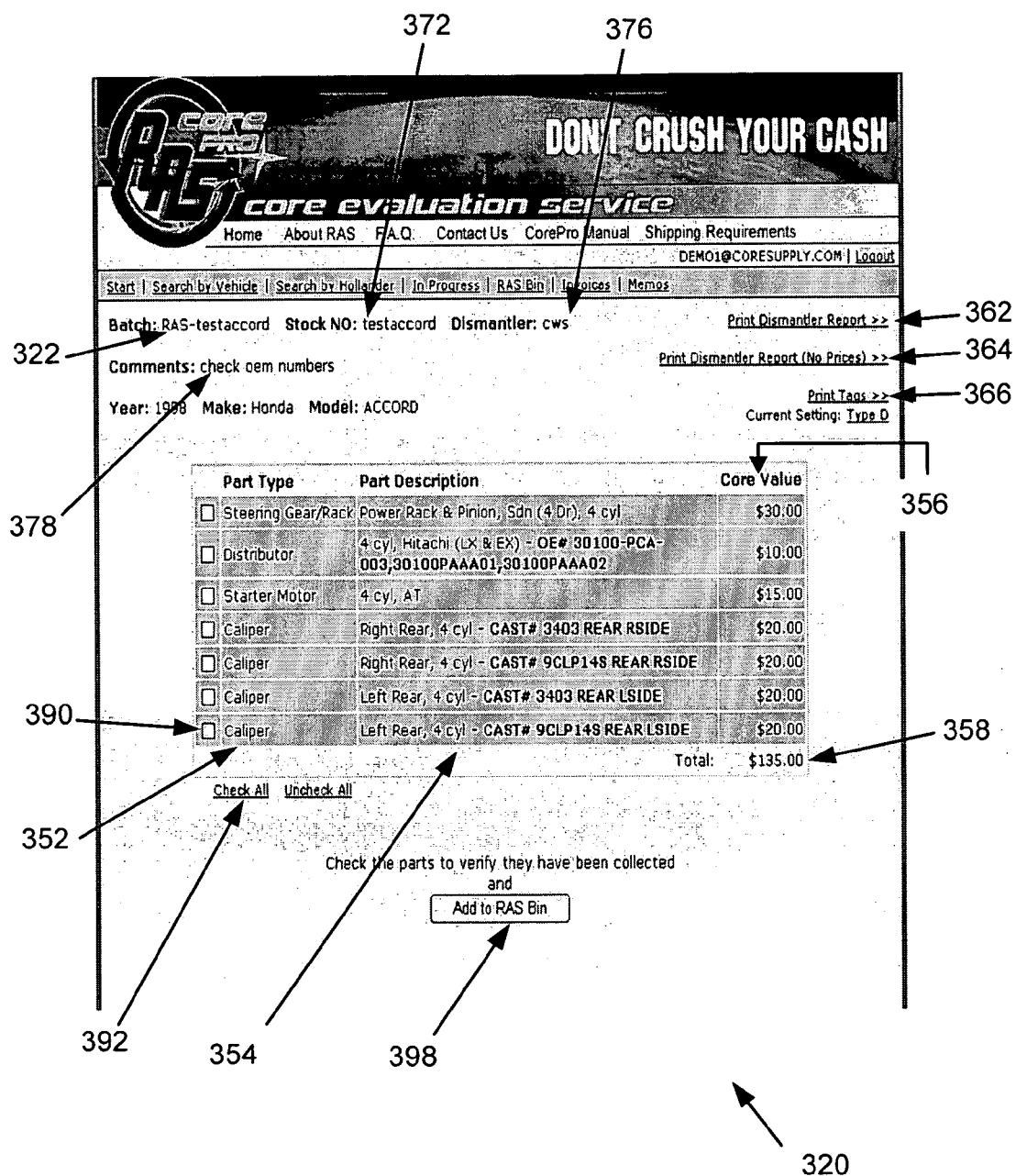
Figure 2J:
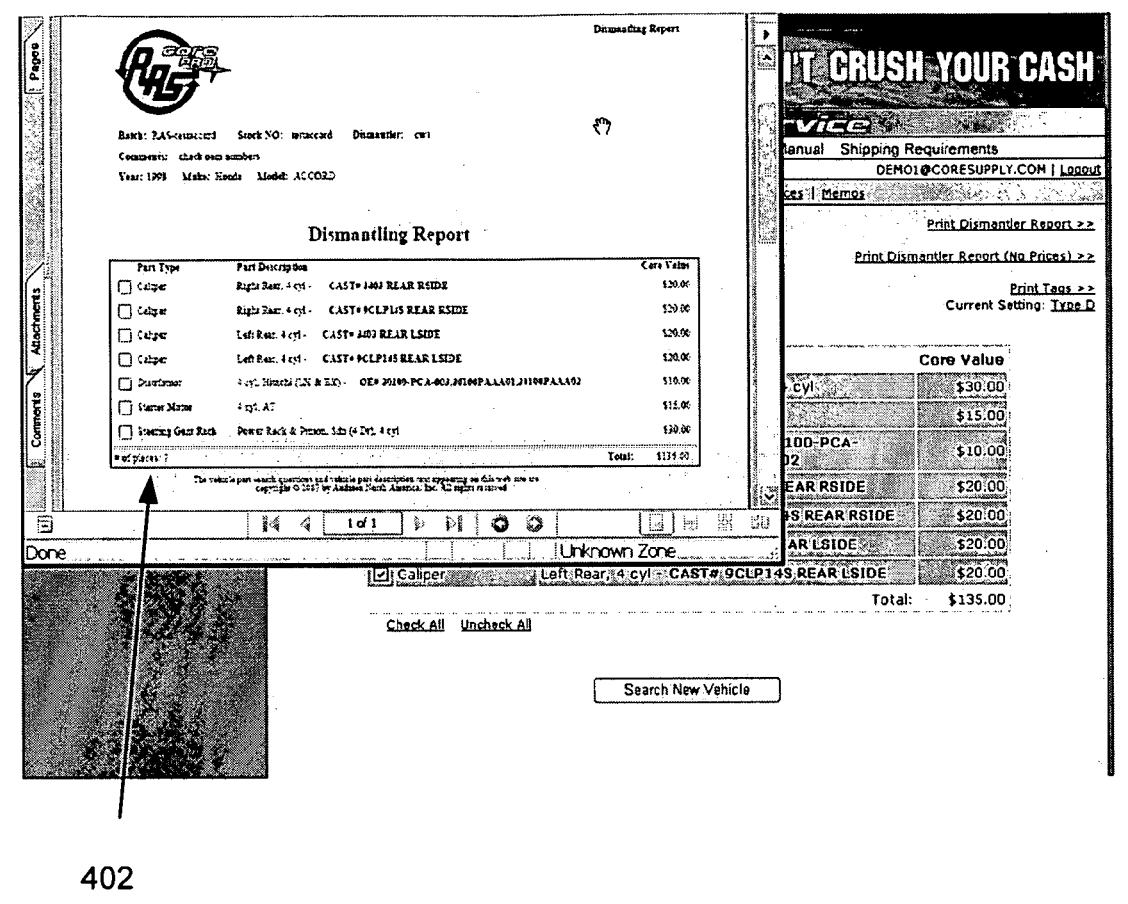
Figure 2K:
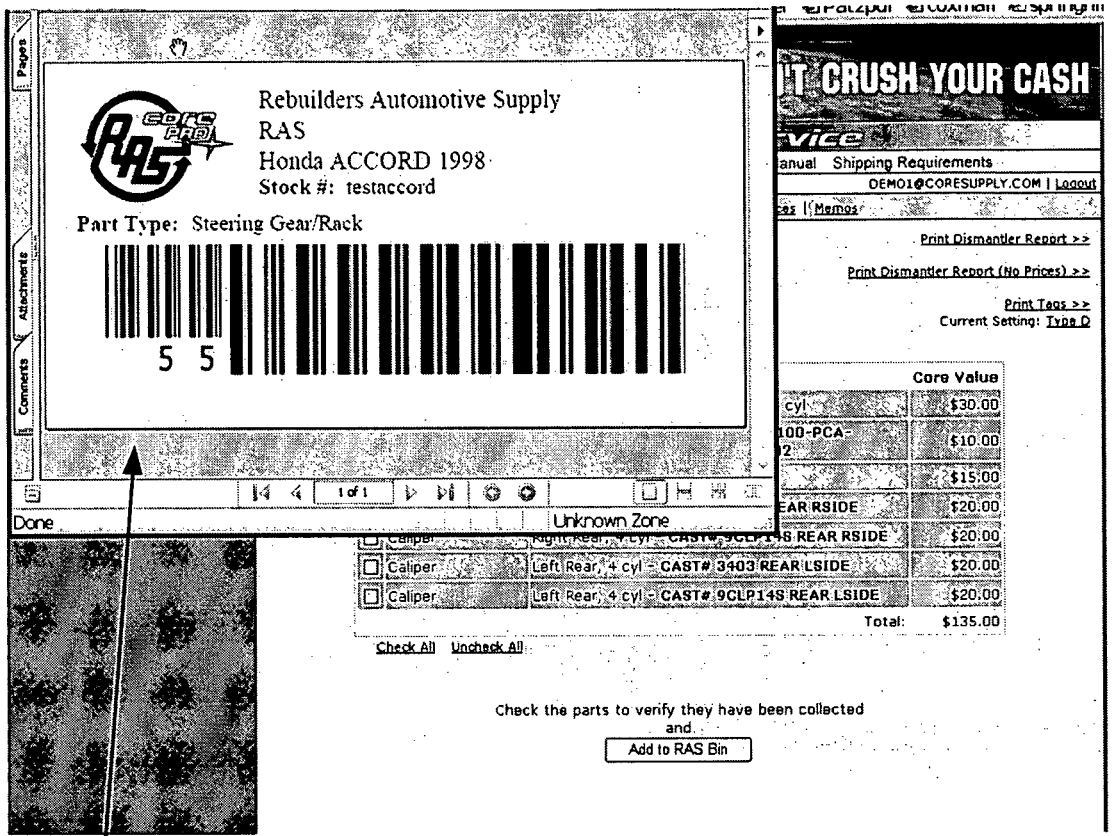
Figure 2L:
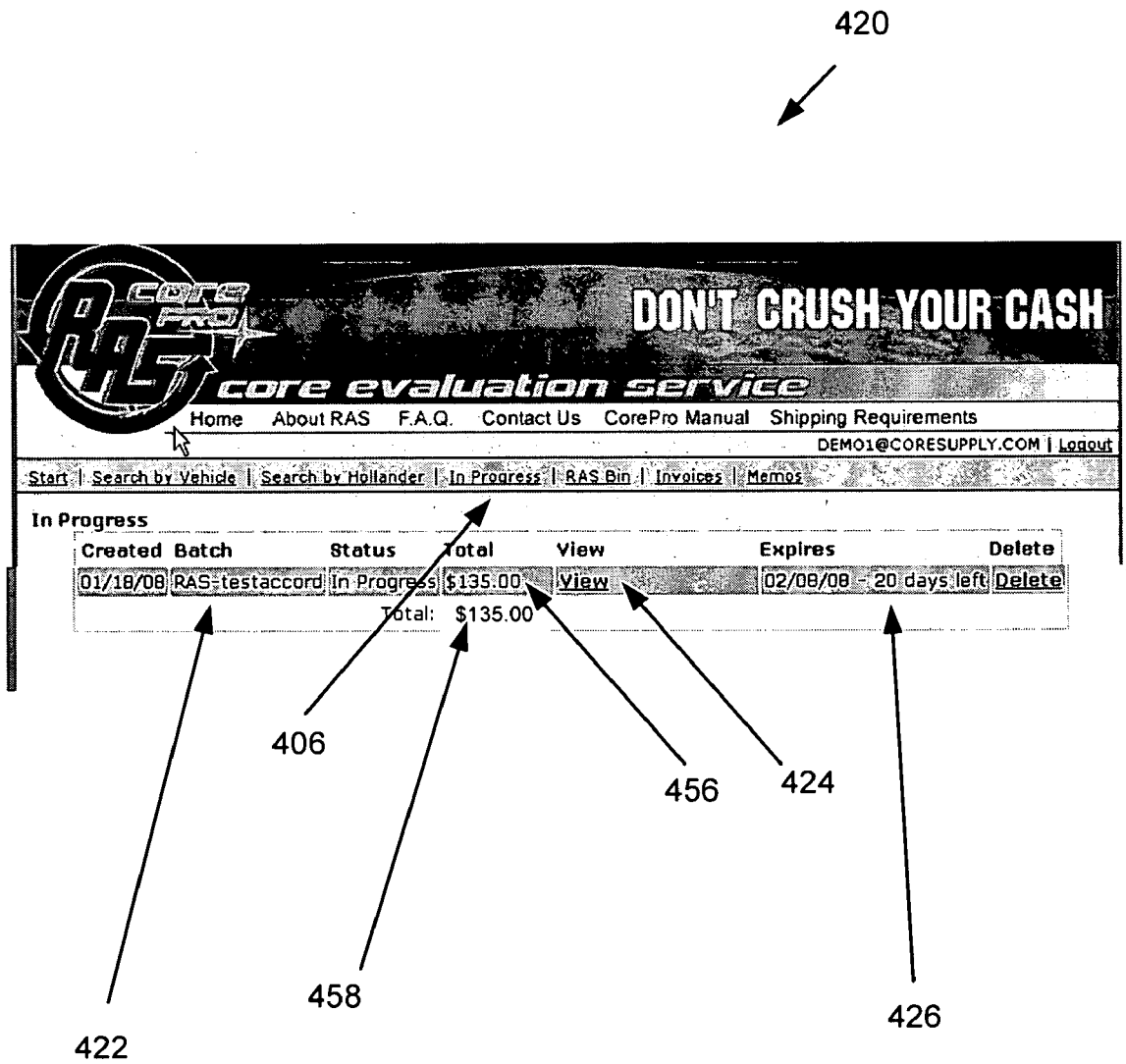
Figure 2M:
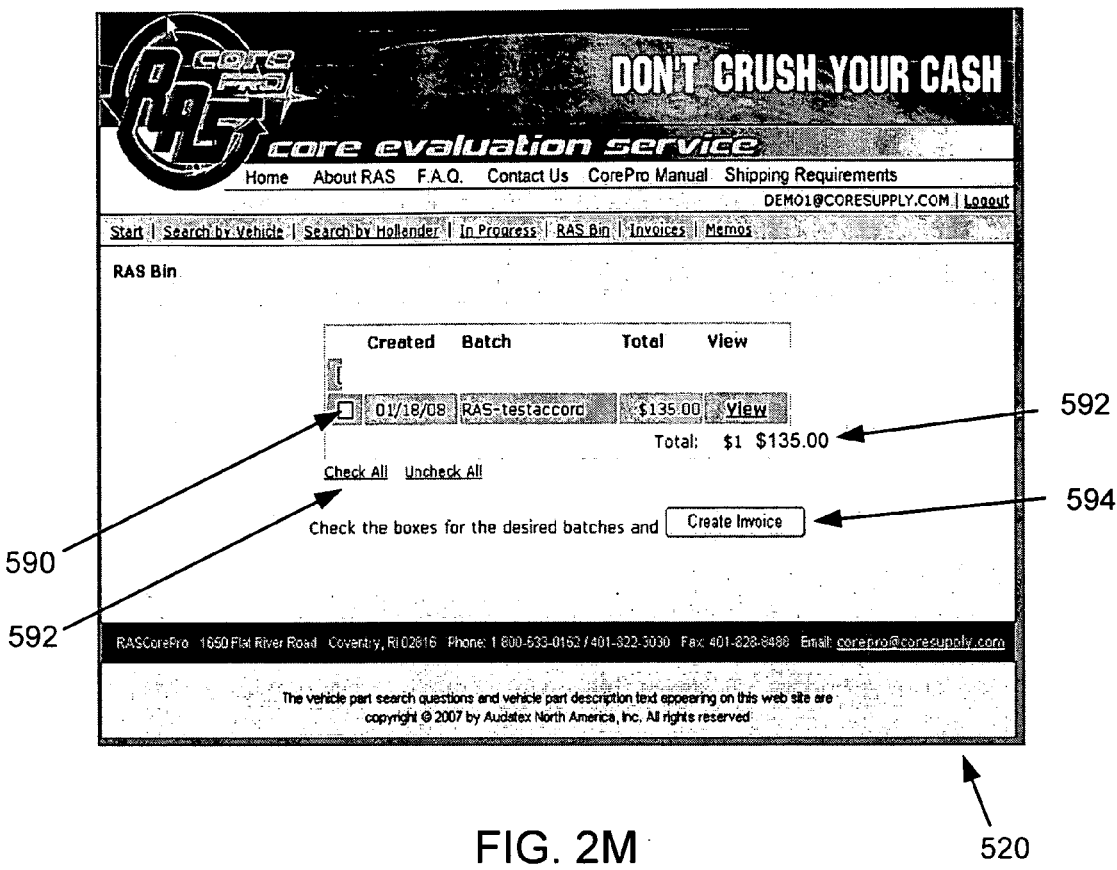
Figure 2N:
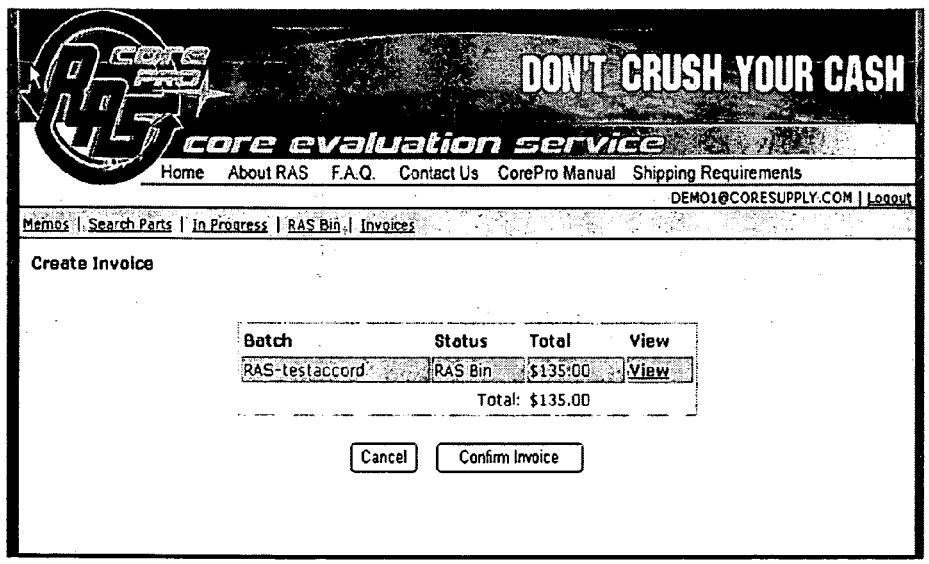
Figure 2R:
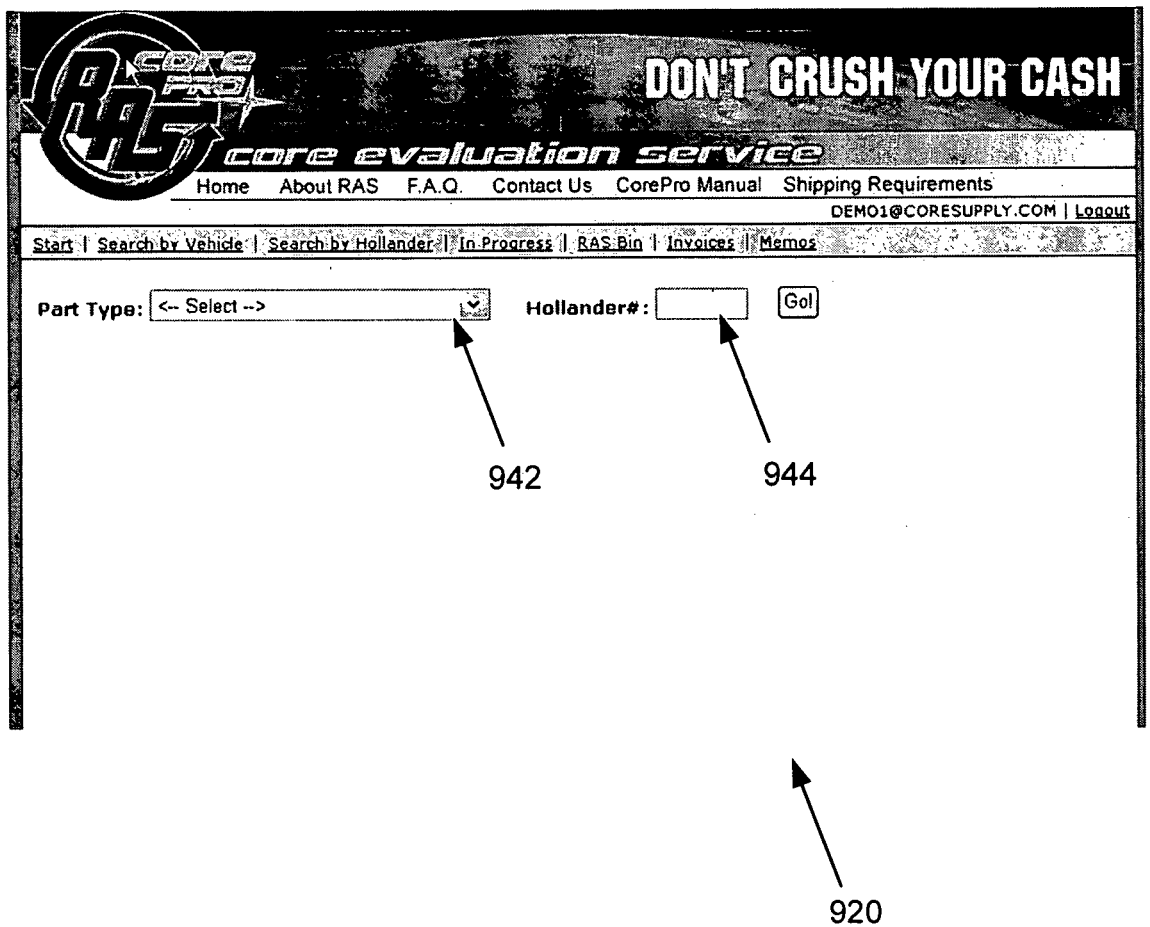
Figure 2S:
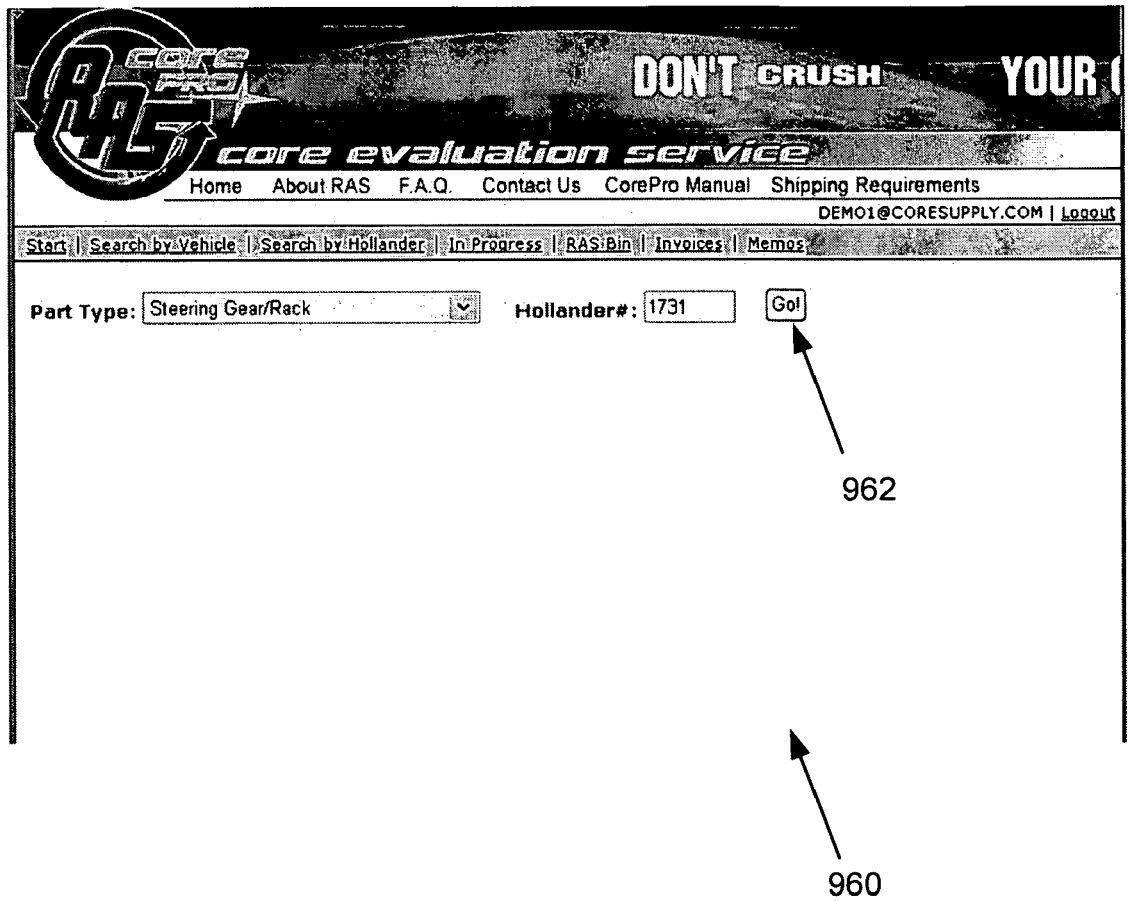
Figure 2T:
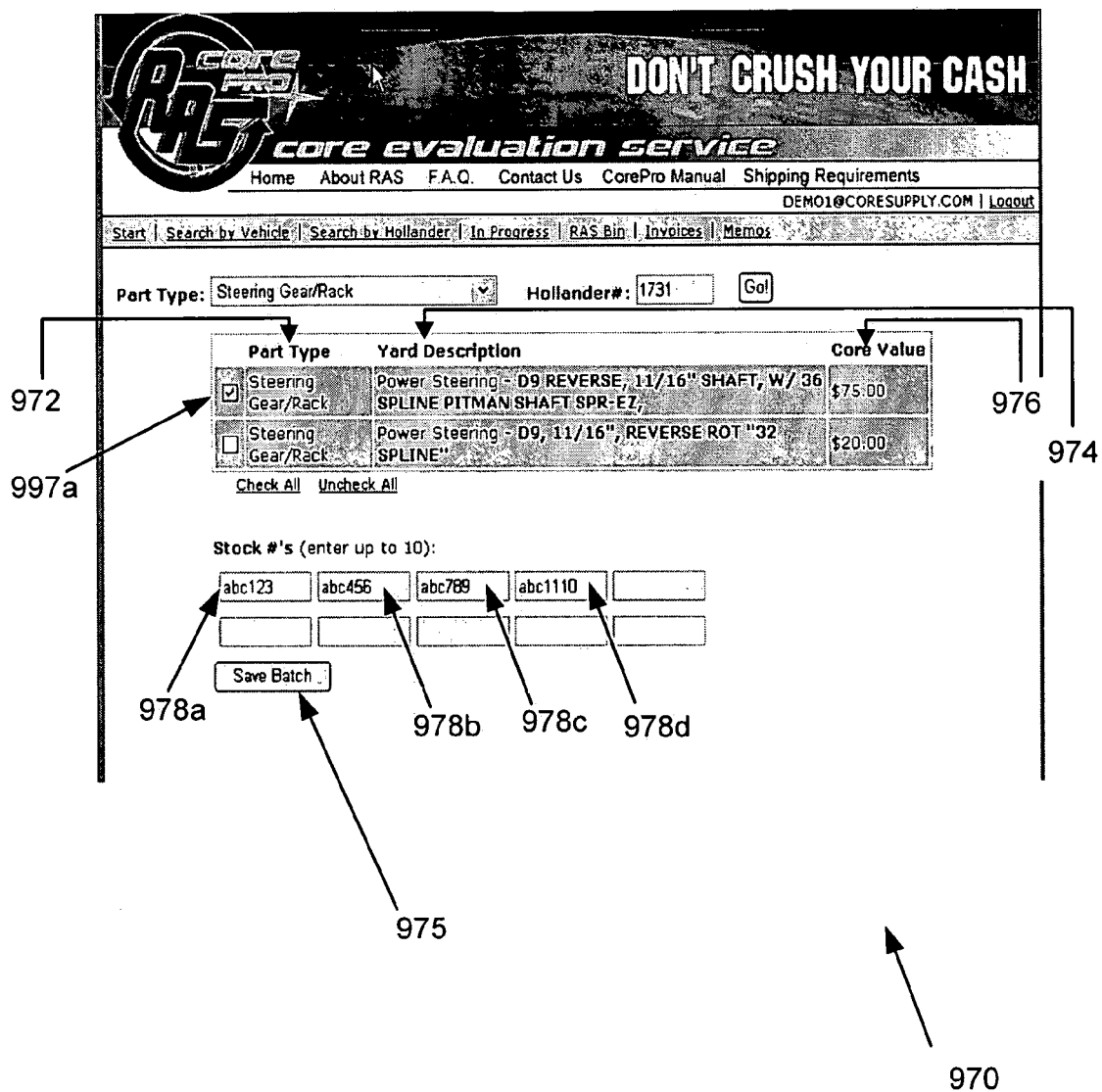
Figure 2U:
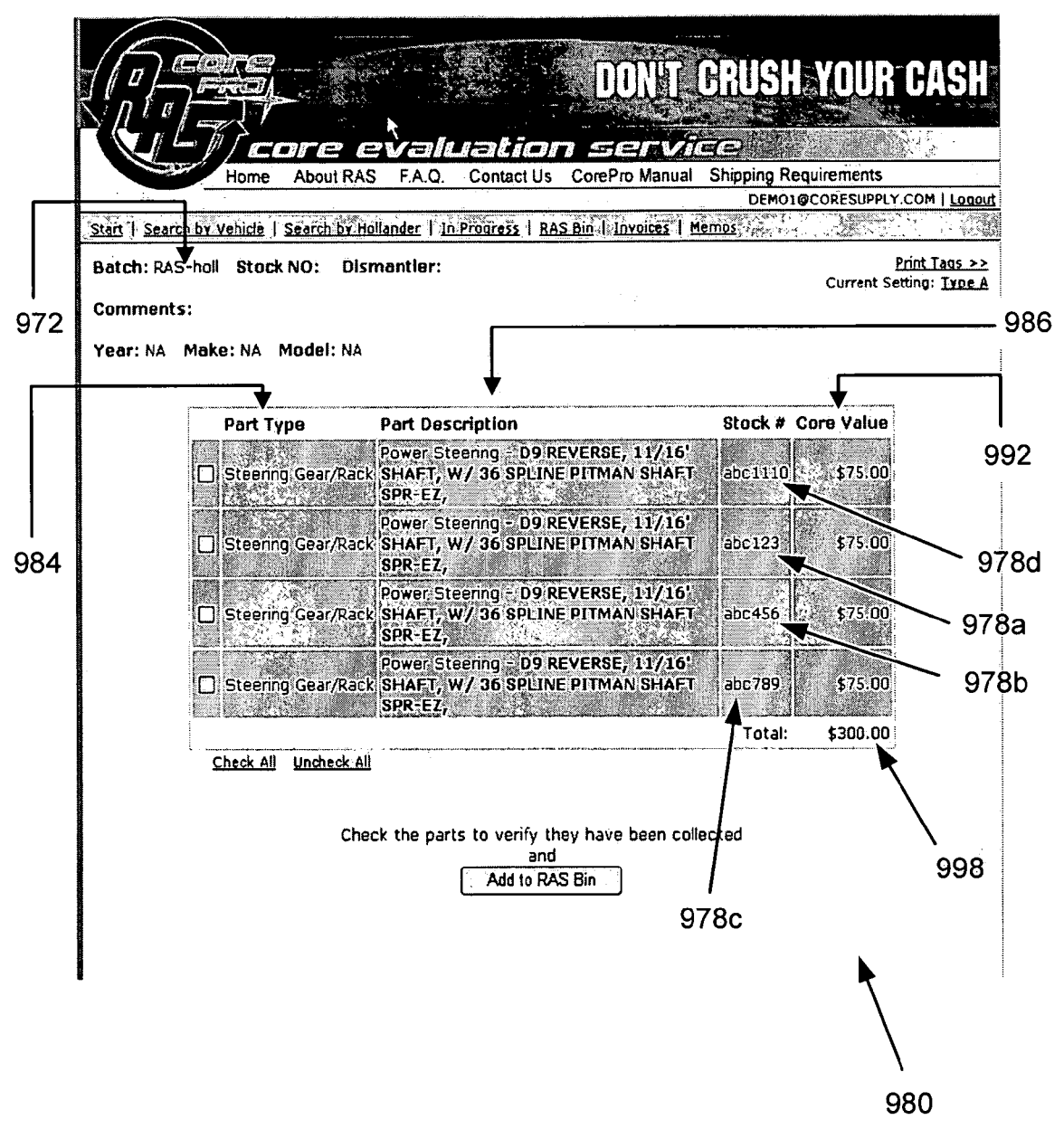
Figure 2W:
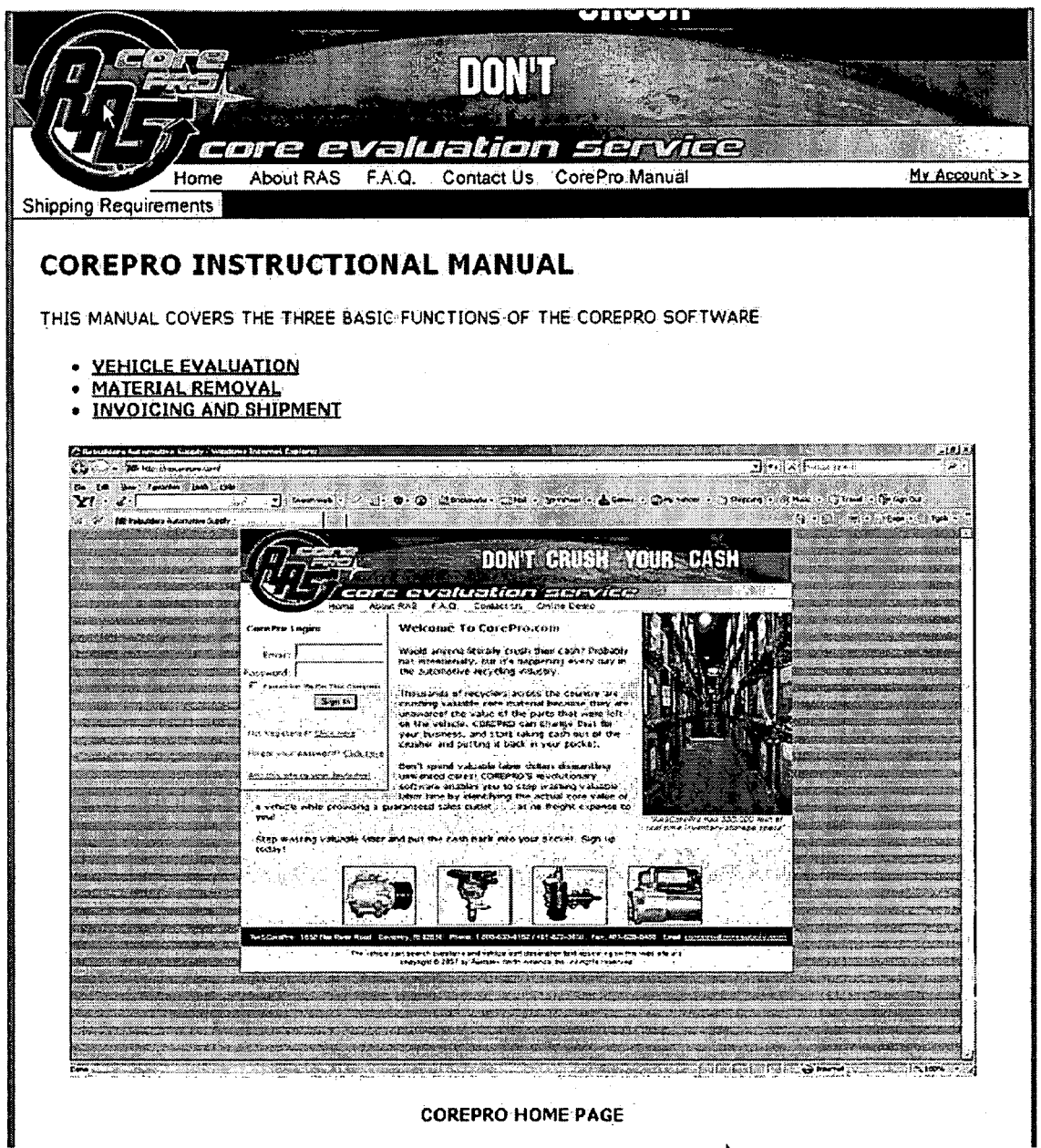

FIGS. 2A-2W show example user interface screens that are generated by the automotive core fulfillment system 10 of FIG. 1. The system logon page 200 is illustrated in FIG. 2A. On this logon page 200, a user (such as automotive recycler 6) may access the automotive core fulfillment system 10 by entering an email address in a sign in block 202 and by entering a password in password block 204 by using terminal 4 via network 2. Users that have not previously accessed the automotive core fulfillment system may register to use the system by accessing a registration hotlink 206.

As shown in FIG. 2B, once a user (automotive recycler 6) has accessed the automotive core fulfillment system 10, the interface module 30 generates a start screen 220. The start screen 220 enables an automotive recycler 6 to interact with the automotive core fulfillment system 10 by accessing demand and pricing information for automotive cores by searching vehicles using button 221 and by searching by automotive core interchange numbers using button 222. Start screen 220 also enables automotive recyclers 6 to access in-progress inventory information using button 223, core bin information using button 224, invoicing information using button 225, and additional system particulars, including system memos using button 226, frequently asked questions using link 227, contact information using link 228, the automotive core fulfillment system manual using link 229, and shipping requirements using link 230. Additional information regarding the automotive core fulfillment system of the present invention may also be shown and accessed through additional buttons, hot links, and other user interface devices that enable an automotive recycler 6 to access the automotive core fulfillment system 10 using terminal 4 via network 2.

Search by Vehicle

A user may search for automotive cores by a particular vehicle. For example, if an automotive recycler 6 selects the search vehicle button 221, a user input screen 240 as shown in FIG. 2C is generated by interface module 30 to allow the automotive recycler 6 to enter vehicle information, including Year, Make, and Model, into the automotive core fulfillment system 10 to access core information. To access the core information, automotive recycler 6 selects the Year the car was manufactured using drop down box 242. In this example, the automotive recycler 6 selected "1998." The user interface screen 240 shown is implemented using drop down menu selections, but it may be implemented using an expandable tree structure for such vehicle information, or in any other appropriate manner that conveys the necessary information with which to search the databases 40, 50, 70 of the automotive core fulfillment system 10.

As shown in FIG. 2D, once the automotive recycler 6 selects the Year the car was manufactured, the automotive recycler 6 selects the Make of car using drop down box 244. In this example, the user selected "Honda." As further shown in FIG. 2E, once the automotive recycler 6 selects the Make of car, the automotive recycler 6 selects the Model of car using drop down box 246. In this example, the automotive recycler 6 selects "Accord" as shown in FIG. 2F.

Figure 3:
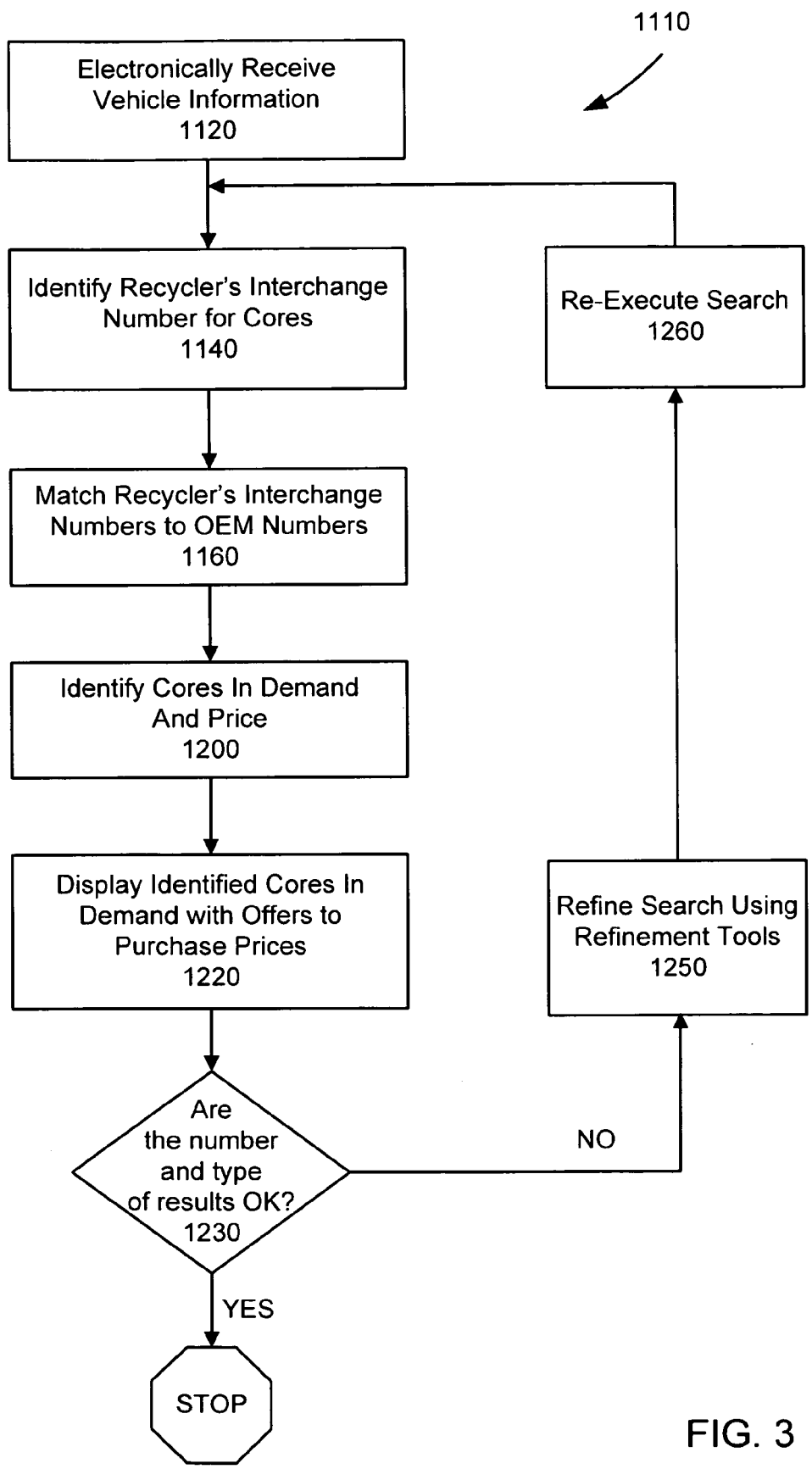
FIG. 3 is a flow diagram schematically illustrating a method of determining a core value based upon vehicle and part identification information in accordance with one embodiment of the present invention.

FIG. 3 is a flow diagram 1100 that schematically illustrates a method of operation in accordance with one embodiment of the present invention. Once the automotive recycler 6 has completed selecting the Year, Make, and Model of car from which to base the search, the automotive core fulfillment system 10 receives the vehicle information as shown in step 1120 in the flow chart of FIG. 3. Of course, multiple vehicles may be used from which to base the search and to identify multiple cores simultaneously. For example, a list of vehicle identifiers may be used, such as a manual list, a bar code or bar codes, an electronic VIN number or VIN numbers, or any other notation of multiple vehicle vehicles. With this vehicle identifier information, a core inventory value may be determined based upon an aggregate total of core values of identified automotive cores. Of course, other means of providing the vehicle information may also be used, such as direct data feeds, RSS feeds (RDF site summary feeds or Really Simple Syndication feeds), and the like.

Regardless of the manner in which the vehicle information is provided, in step 1120, automotive core fulfillment system 10 receives the vehicle information via interface module 30.

As further shown in step 1140 of FIG. 3, once the automotive core fulfillment system 10 receives the vehicle information, the processor 20 directs a search of the interchange database 40 to identify the recycler's interchange number for the core or cores. In step 11160, the interchange number matching module 60 and the processor 20 match the recycler's interchange numbers from the interchange database 40 to the core supplier numbers, such as the OEM numbers in OEM Number database 50 in the present example.

In step 1200 of FIG. 3, interchange number matching module 60 and the processor 20 and identifies those cores for the inputted vehicle (1988 Honda Accord) and processor 20 accesses demand and pricing database 70 to further identify those cores for which there is demand. The processor 20 and interface module 30 then identifies the salvage value for the particular cores identified. Once the cores and their respective demand and pricing information is determined, in step 1220 of FIG. 3, the system returns a vehicle evaluation page 250 that shows the part type 252, yard description 254, and core value 256 of the particular automotive core as illustrated in FIG. 2G. Additionally, as shown in FIG. 3, if the number and type of results identified are not satisfactory in step 1230, the search may be further refined to narrow down the number and type of results returned using refinement tool search mechanism 234 as shown in step 1250. For example, the results may be refined based upon engine displacement 258, the number of cylinders 260, the transmission type 262, the number of doors 264, and the braking system 266. Of course other factors may also be used to refine the search, including drive type (front wheel versus rear wheel versus all wheel), and the like. When the refinement tools are selected, the search may be re-executed in step 1260 using the refine search button 268; The results of the refined search will then be presented as the vehicle evaluation page 250.

Vehicle evaluation page 250 lists automotive parts that the core supplier wishes to purchase and the offer price that the core supplier is willing to pay to a dismantler or to a recycler or to a salvage yard for the particular part. The vehicle evaluation page 250 returns a list of parts with the part type 252 and a yard description 254 with which to identify each core. The yard description 254 may also include appropriate interchange numbers, such as Hollander numbers or Lester numbers, and the like, as well as OEM descriptions to help further determine the identity of each part. Additionally, the core supplier may also provide additional descriptive information with which to identify and confirm the parts listed. Further, the listed parts may also include additional description information requiring a Cast number or an OEM number on the part in order for the part to be worth the core value listed. For example, cast descriptions may be shown in bold face type, while other information may be displayed in italics or within parentheses or in any similar manner so as to identify the notations in the yard description 254 field. The core value 256 is listed for each part offered by the core recycler. Cores that have no demand or no value to remanufacturers may be listed with a core value of $0.00 as in the present example, or may be omitted from the vehicle evaluation page 250. The core values help automotive dismantlers determine if it is cost effective to remove particular cores from the vehicle. Of course, vehicle evaluation page 250 may display different interchange numbers, be arranged differently, and provide additional information in other implementations of the present invention.

As shown in FIG. 2H, automotive recycler 6 can select those cores that the automotive recycler 6 wishes to remove from the vehicle and sell to the core supplier by checking boxes 97a-97g. The checked boxes 97a-97g correspond to those cores to be removed from the vehicle and sold to the core supplier at the offered purchase price displayed as core value 256. As further shown in FIG. 2H, once the automotive recycler 6 checks the parts that they wish to remove, the automotive recycler 6 may enter the stock number 272, vehicle identification number (VIN) 274, a dismantler 276, any notes 278 or special instructions.

Optionally, the system of the present invention may also include an optional button or hot link indicating or confirming that by submitting this batch of core parts, the automotive recycler 6 agrees to comply with any materials requirements specified by the core supplier or any other shipping and exchange policies that the core manufacturer has put in place.

Once the automotive recycler 6 completes these entries, the automotive recycler 6 may select the Save Batch button 280 and advance to the Vehicle Summary page 320 shown in FIG. 2I. The Vehicle Summary page 320 is the list of material that the automotive recycler 6 has chosen for removal from the vehicle in question. The Vehicle Summary page 320 shows the batch 322, the stock number 372, dismantler 376, and comments 378 for the year, make, and model vehicle of interest. The Vehicle Summary page 320 further shows the part types 352, part descriptions 354, and the core values 356 for each of the parts that the automotive recycler 6 selected with the check boxes 97a-97g on the vehicle evaluation page 250. A total core value 358 is shown that is the sum of the individual core values 356 for each of the parts listed.

From the Vehicle Summary page 320, an automotive recycler 6 may then view and print a dismantling report by selecting the print dismantler report button 362. Similarly, a dismantler report may be printed without core value prices by selecting the print dismantler report (no prices) button 364. For example, by selecting print dismantler reporter report button 362, the dismantling report 402 depicted in FIG. 2J may be viewed and printed and given to the dismantler to ensure the appropriate parts are collected.

Similarly, returning to FIG. 2I, part tags may be printed to attach to each of the parts as the vehicle is dismantled. The dismantler may then attach tags to the parts as they are removed from the vehicle. By selecting print tags button 368, the tag 404 depicted in FIG. 2K may be viewed and printed and then given to the dismantler to attach to the removed part for inventory control.

The system and method of the present invention may use the tags and tag printers of the automotive recycler 6 and may be printed in a uniform format for ease of inventory control, shipping, and payment upon receipt by the core supplier. Further, a number of tag options may be presented to the automotive recycler 6 the first time that the automotive recycler 6 prints tags. The options may then be saved as a default format with which to print the tags to attach to the parts as the parts are removed from the vehicles.

After the automotive recycler 6 prints the dismantling report 402 and the tags 404, the automotive recycler 6 may then begin dismantling the vehicle, add notes or memos to the system, log out, or create additional reports on other vehicles and parts.

Once the vehicle has been dismantled, and the dismantler has returned the paperwork indicating which parts were actually removed, the automotive recycler 6 may now add the removed parts to the BIN inventory. The typical core supplier BIN is considered to be a 48" cube Gaylord box where all the tagged cores you remove are placed. Of course, other bin types and shipping and storage containers may also be used depending upon the typical shipments, inventory values, and methods of transportation required.

To add the dismantled items to the BIN inventory, the automotive recycler 6 must verify that the parts have been removed from the vehicle. To verify that the parts have been removed, the automotive recycler selects the In Progress tab 406, such as that shown on FIG. 2L. FIG. 2L shows the In Process page 420 that lists the in-progress vehicles by batch 422, (generated from stock number 272 entered on the vehicle evaluation page 250). The automotive recycler 6 may then select the proper batch 422 and click on the view link 424. Selecting the view link 424 returns the Vehicle Summary page 320 for the particular vehicle.

As shown in FIG. 2L on the In Process page 420, the in-progress batch includes an expiration date 426. To accommodate constantly changing markets for core parts, the core supplier may restrict the time that the automotive recycler 6 is afforded in which to process a vehicle. In the example of FIG. 2L, the core supplier allowed a 21-day window in which to process the vehicle. If the automotive recycler 6 has not processed the vehicle within the 21-day timeline, the view link 424 will change to a "re-evaluate link" (not shown). If the automotive recycler 6 selects the re-evaluate link, the automotive recycler 6 will return to the vehicle evaluation page 250. Any parts that were initially chosen for removal will remain checked off on the vehicle evaluation page 250, and the automotive recycler 6 must re-evaluate the removal decisions based on any new market prices and demand, if applicable. The automotive recycler 6 must then re-save the batch with the new prices.

An overall dollar value is displayed for your entire "In Progress" inventory. A total in-process value 458 is shown that is the sum of the individual in-process batch totals 456 for each of the batches listed. In the example of FIG. 2L, a single batch 422 is listed, so the total in-process value 458 is the same as that of the single batch total 456. In this example, the total is $135.00.

As outlined above, once the automotive recycler 6 selects the view link 424 from the "In Progress" page 420, the "vehicle summary" page 320 as shown in FIG. 2I is displayed. The automotive recycler 6 then checks the boxes 390 indicating the parts that the dismantler removed from the vehicle. Alternatively, if all indicated parts were removed, the automotive recycler 6 may select the check all box 392, indicating that the dismantler removed all the parts.

Once the automobile recycler 6 verifies that parts were removed and placed in the core supplier BIN, the automotive recycler 6 selects the "Add to RAS Bin" button 398. By selecting the "Add to RAS Bin" button 398, the checked parts are added to the automotive recycler's BIN inventory. Once the selected parts are added to the BIN inventory, the BIN screen 520 illustrated in FIG. 2M is displayed. As shown in FIG. 2M, the BIN screen 520 includes an indication of the total dollar amount 522 of the automotive recycler's inventory.

The BIN inventory is electronically monitored by the core supplier. The system and method of the present invention permits the core supplier to keep a running total of the number of parts and the dollar value of the parts in the BIN inventory. The core supplier contacts the automotive recycler 6 to schedule a materials pick up when it appears that the automotive recycler 6 has enough parts in the BIN inventory to warrant a shipment. Flexibility is built into the system of the present invention, and if the automotive recycler 6 has an inordinate volume of inventory, or an inventory with a high dollar value, additional pick ups may be scheduled through the BIN screen 520.

Once the Bin contents are confirmed, the automotive recycler 6 checks box 590 to select the created batch. Alternatively, the automotive recycler 6 may check the check all button 592 to choose all material currently in the BIN inventory. Once the appropriate batches have been checked, the automotive recycler 6 selects the "Create Invoice" button 594 to create an invoice 620 as shown in FIG. 2N.

After invoice 620 is displayed, the automotive recycler 6 may review the invoice 620 and then confirm the invoice 620. To ensure accuracy with in-transit inventory, the automotive recycler 6 confirms the accuracy of the invoice 620 before the material is removed from inventory. To confirm the invoice 620, the automotive recycler 6 selects the "confirm invoice" button 624. The process then advances to the Invoice Detail page 720 as shown in FIG. 2O. After creating an invoice 620, the inventory material is electronically removed from the core supplier BIN, and the core supplier is automatically notified electronically. The core supplier then contacts the automotive recycler 6 with a Purchase Order Number and arranges for shipping.

As shown in FIG. 2O, from the Invoice Detail page 720, the automotive recycler 6 may print the invoice and/or a packing slip by selecting the respective print buttons 724, 726. Selecting the print invoice button 724 displays invoice 820 as shown in FIG. 2P, while selecting print packing slip button 726 displays packing slip 830 as shown in FIG. 2Q. The invoice 820 and packing slip 830 may then be included with the parts shipment or kept with the automotive recycler's records. Once the Bins are shipped and the materials arrive at the core supplier facility, the materials are checked in using the appropriate stock number, invoice, and packing slip. Upon completion of the check in, a reconciliation report and payment is sent to the automotive recycler 6.

Search by Interchange Number

In addition to searching the automotive core fulfillment system 10 by vehicle, an automotive recycler 6 may search by interchange number, such as a Hollander number, a Lester number, and the like.

For example, returning to start screen 220 shown in FIG. 2B, a user (automotive recycler 6) may search for automotive cores by searching by Hollander number. For example, if automotive recycler 6 selects the search by Hollander button 222, a user input screen 920 as shown in FIG. 2R is generated by interface module 30 to allow an automotive recycler 6 to enter a part type and a Hollander number into the automotive core fulfillment system to access core information. Of course, other interchange information may be used instead of Hollander numbers, but in the present example, an interchange number search is illustrated using Hollander numbers. To access the core information, a user selects the part type using drop down box 942 and enters a Hollander number in box 944. As shown in FIG. 2S, in this example the user selected "Steering Gear/Rack" and Hollander number 1731. The user interface screens 920, 960 shown in FIG. 2R and FIG. 2S are implemented using drop down menu selections, but they may be implemented using an expandable tree structure for such vehicle information, or in any other appropriate manner that conveys the necessary information with which to search the databases 40, 50, 70 of the automotive core fulfillment system 10.

Once the par type and interchange number are entered, the automotive recycler 6 selects the Go box 962 in FIG. 2S, and the system returns vehicle evaluation page 970 of FIG. 2T that shows the part type 972, yard description 974, and core value 976 of the particular automotive cores. As was the case when searching by vehicle, vehicle evaluation page 970 lists automotive parts that the core supplier wishes to purchase and the offer price that the core supplier is willing to pay to a dismantler or to an automotive recycler or to a salvage yard for the particular part. The vehicle evaluation page 970 returns a list of parts with the part type 972 and a yard description 974 with which to identify each core. The yard description 974 in this search may also include appropriate OEM descriptions to help determine the identity of each part. Additionally, the core supplier may also provide additional descriptive information with which to identify and confirm the parts listed. Further, the listed parts may also include additional description information requiring a Cast number or an OEM number on the part in order for the part to be worth the core value listed. For example, cast descriptions may be shown in bold face type, while other information may be displayed in italics or within parentheses or in any similar manner so as to identify notations in the yard description 974 field. The core value 976 is listed for each part offered by the core recycler. As above, cores that have no demand or no value to remanufacturers may be listed with a core value of $0.00 or may be omitted from the vehicle evaluation page 970. The core values help automotive dismantlers determine if it is cost effective to remove particular cores from the vehicle. Of course, vehicle evaluation page 970 may display different part types, descriptions, interchange numbers, and may be arranged differently to provide additional information in other implementations.

As shown in FIG. 2T, the automotive recycler 6 indicates the parts that the automotive recycler 6 wishes to remove from the vehicle and sell to the core supplier by checking box 997a. The checked box 997a corresponds to that core to be removed from the vehicle and sold to the core supplier at the offered purchase price (core value 976) displayed. As further shown in FIG. 2T, once the automotive recycler 6 checks the parts that they wish to remove, the automotive recycler 6 may enter stock numbers 978a-978d and save the batch by selecting the save batch button 975. Of course additional information may also be added to the batch, including, for example vehicle identification numbers (VINs), dismantler information, and any notes or special instructions.

Optionally as above, the system of the present invention may also include an optional button or hot link indicating or confirming that by submitting this batch of core parts, the automotive recycler agrees to comply with any materials handling requirements specified by the core supplier or any other shipping and exchange policies that the core manufacturer has put in place.

Once the stock numbers 978a-978d are entered and the automotive recycler 6 saves the batch by selecting the save batch button 975, the batch results of the search will then be presented as the vehicle summary page 980 shown in FIG. 2U. As was the case above when searching by vehicle, the Vehicle Summary page 980 is the list of material that the automotive recycler 6 has chosen for removal from the vehicle in question. Similarly, the Vehicle Summary page 980 shows the batch 982 and the listing of part types 984, part descriptions 986, and core values 992 as sorted by the stock numbers 978a, 978b, 978c, 978d. A total core value 998 is shown that is the sum of the individual core values 992 for each of the parts listed.

Once the automotive recycler 6 reviews the vehicle summary page 980, the process continues in a similar manner as was the case outlined above with regard to FIG. 2I to FIG. 2Q when interacting with the automotive core fulfillment system 10 of the present invention by searching by vehicle.

Memos

In addition to searching the automotive core interchange system 10 by vehicle or by interchange number, the automotive core fulfillment system 10 includes the facility to review critical system information by selecting the memos button 226 shown in FIG. 2B. When an automotive recycler 6 selects the memos button 226, memos screen 150 is displayed as shown in FIG. 2V. Memos screen 150 includes example updates 152a, 152b, 152c, 152d, 152e to information regarding the automotive core fulfillment system 10 and the features and capabilities provided.

Manual

In addition to searching the automotive core fulfillment system 10 by vehicle or by interchange number and accessing memos regarding updates and other information, the automotive core fulfillment system 10 includes the facility to review the operations manual by selecting the manual button 229 shown in FIG. 2B. When an automotive recycler 6 selects the manual button 229, the instruction manual screen 170 is displayed as shown in FIG. 2W. Instruction manual screen 170 includes step-by-step instructions to effectively utilize the automotive core fulfillment system 10 of the present invention and provides a graphical foundation for updates to information regarding the automotive core fulfillment system 10 and the features and capabilities provided.

The automotive core fulfillment system 10 in accordance with the illustrated embodiment as described above is invaluable to automotive recyclers because it allows them to determine what the cores of a particular vehicle and their core inventory is truly worth, while also enabling them to have better control over labor costs. As described, the present invention allows automotive recyclers to control their labor costs because they will no longer waste time removing core parts that have little or no value, and can readily identify the core parts with value.

Moreover, the automotive core fulfillment system 10 in accordance with the illustrated embodiments provides an especially advantageous use in that it can be used during the dismantling process before the vehicle is moved into storage, for example, in a salvage yard, thereby allowing the automotive recycler 6 to remove a wider range of cores that are of value. The system and method of the present invention allows the automotive recycler 6 to make quick determinations as to whether to invest in the labor required to remove the particular automotive cores with value.

For example, a power brake booster core for a particular vehicle model may be worth $15 based on current demand and pricing information as provided by database 70. With the vehicle in the dismantling facility of the automotive recycler, the removal of the core with the available tools in the dismantling facility may only be 5-10 minutes, thus, making it economically worthwhile to remove the brake booster core. If the brake booster core has to be removed while the vehicle is in the storage facility of the automotive recycler, it may take much longer, for example, 15-20 minutes. Such labor requirements would render the brake booster core not worth removing.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The claimed invention is:

1. An automotive core fulfillment system comprising:
 an interchange database that includes automotive core descriptions with corresponding automotive recycler interchange identification indicators, the core descriptions describing automobile part assemblies to be remanufactured;
 a core supplier database that includes automotive core descriptions with corresponding core supplier identification indicators, the core suppliers acquiring quantities of automobile cores to be remanufactured;
 an interchange number matching computing device configured to equate the recycler interchange identification indicator database entry in the interchange database with a core supplier identification database entry in the core supplier database; and
 an interface computing device configured to provide access to the automotive core fulfillment system and accept vehicle information and provide demand and pricing information for automotive cores indicative of a remanufacturer requesting the automotive core for purchase, the pricing information indicating an offer for purchase price that a core supplier will pay based upon the demand of remanufacturers for the automotive core.

2. The automotive core fulfillment system of claim 1, wherein the interface module provides remote access to the automotive core fulfillment system through a computer network.

3. The automotive core fulfillment system of claim 1, wherein the interchange identification indicators are Hollander numbers.

4. The automotive core fulfillment system of claim 1, wherein the interface computing device is further configured to:
 receive an indication from an automotive recycler indicating the identified automotive core to be removed and sold to a core supplier at the offered purchase price;
 display a vehicle summary page listing cores the automotive recycler has chosen for removal and sale and a total core value of offered purchase prices;
 display a dismantler report to ensure appropriate cores are removed by the automotive recycler;
 display core part tags to attach to each removed core as a vehicle is dismantled;
 receive a bin inventory from the automotive recycler indicating the removed core was added to in-process inventory to be sold to the core supplier;
 confirm the bin inventory from the automotive recycler; and
 generate an invoice of the automotive cores in the bin inventory to accompany the automotive cores sold to the core supplier.

5. A computer-implemented method of identifying an automotive core and determining the value of the automotive core with a core fulfillment system, the method comprising:
 receiving vehicle identification information in an interface computing device;
 comparing the vehicle identification information in the interface computing device to automotive core descriptions and automotive interchange numbers in an interchange database and core supplier identification indicators in a core supplier database that correspond to the vehicle identification information;
 identifying the automotive core with an interchange number matching computing device based upon the comparison of the vehicle identification information to automotive core descriptions and automotive interchange numbers and core supplier identification indicators, the automotive core including a part type identifier, a yard description, and a core value;

determining, with a demand and pricing database, a core inventory value based upon an aggregate total of core values of identified automotive cores; and displaying a vehicle evaluation page showing the core type, yard description, and core value, the core value indicating an offer for purchase price that a core supplier will pay based upon the demand of remanufacturers for the automotive core.

6. The method of claim 5, wherein the identified automotive core entry further includes demand for the automotive core.

7. The method of claim 5, wherein the vehicle identification information includes the year the vehicle was manufactured, the make of the vehicle, and the model of the vehicle.

8. The method of claim 7 further comprising:

receiving, in the interface computing device, at least one of engine displacement volume, number of cylinders, transmission type, number of doors, identification number, and brake type to supplement the vehicle identification information; and comparing, with the interchange number matching computing device, the at least one of engine displacement volume, number of cylinders, transmission type, number of doors, identification number, and brake type to automotive core descriptions and automotive interchange numbers and core supplier identification indicators that correspond to the vehicle identification information to further identify the automotive core.

9. The method of claim 5, wherein the vehicle identification information includes a list of vehicle identifiers to process multiple vehicles simultaneously.

10. The method of claim 9, wherein the list of vehicle identifiers includes at least one of an electronic VIN number or a bar code with which to process multiple vehicles simultaneously.

11. The computer-implemented method of claim 5 further comprising:

receiving an indication from an automotive recycler indicating the identified automotive core to be removed and sold to a core supplier at the offered purchase price;

displaying a vehicle summary page listing cores the automotive recycler has chosen for removal and sale and a total core value of offered purchase prices;

displaying a dismantler report to ensure appropriate cores are removed by the automotive recycler;

displaying core part tags to attach to each removed core as a vehicle is dismantled;

receiving a bin inventory from the automotive recycler indicating the removed core was added to in-process inventory to be sold to the core supplier;

confirming the bin inventory from the automotive recycler;

generating an invoice of the automotive cores in the bin inventory to accompany the automotive cores sold to the core supplier.

12. A computer-implemented method of identifying an automotive core and determining the value of the automotive core with a core fulfillment system, the method comprising:

receiving part type identification information in an interface computing device;

receiving an automotive interchange number in the interface computing device;

comparing the part type identification information in the interface computing device to automotive core descriptions and core supplier identification indicators in a core supplier database that correspond to the vehicle identification information and the automotive interchange numbers in an interchange database;

identifying the automotive core with an interchange number matching computing device based upon the comparison of the part type identification information and automotive interchange number to automotive core descriptions and core supplier identification indicators, the automotive core including a part type identifier, a yard description, and a core value;

determining, with a demand and pricing database, a core inventory value based upon an aggregate total of core values of identified automotive cores; and displaying a vehicle evaluation page showing the core type, yard description, and core value, the core value indicating an offer for purchase price that a core supplier will pay based upon the demand of remanufacturers for the automotive core.

13. The method of claim 12, wherein the identified automotive core entry further includes demand for the automotive core.

14. The computer-implemented method of claim 12 further comprising:

receiving an indication from an automotive recycler indicating the identified automotive core to be removed and sold to a core supplier at the offered purchase price;

displaying a vehicle summary page listing cores the automotive recycler has chosen for removal and sale and a total core value of offered purchase prices;

displaying a dismantler report to ensure appropriate cores are removed by the automotive recycler;

displaying core part tags to attach to each removed core as a vehicle is dismantled;

receiving a bin inventory from the automotive recycler indicating the removed core was added to in-process inventory to be sold to the core supplier;

confirming the bin inventory from the automotive recycler; and generating an invoice of the automotive cores in the bin inventory to accompany the automotive cores sold to the core supplier.

15. A computer readable storage media for identifying an automotive core and determining the value of the automotive core with a core fulfillment system, the computer readable storage media comprising one or more computer-readable instructions configured to cause one or more computer processors to execute operations comprising:

receiving vehicle identification information;

comparing the vehicle identification information to automotive core descriptions and automotive interchange numbers and core supplier identification indicators that correspond to the vehicle identification information;

identifying the automotive core based upon the comparison of the vehicle identification information to automotive core descriptions and automotive interchange numbers and core supplier identification indicators, the automotive core including a part type identifier, a yard description, and a core value;

determining a core inventory value based upon an aggregate total of core values of identified automotive cores; and displaying a vehicle evaluation page showing the core type, yard description, and core value, the core value indicating an offer for purchase price that a core supplier will pay based upon the demand of remanufacturers for the automotive core.

16. The computer readable storage media of claim 15, wherein the identified automotive core entry further includes demand for the automotive core.

17. The computer readable storage media of claim 15, wherein the vehicle identification information includes the year the vehicle was manufactured, the make of the vehicle, and the model of the vehicle.

18. The computer readable storage media of claim 17 further comprising computer-readable instructions configured to cause one or more computer processors to execute the operations comprising:

receiving at least one of engine displacement volume, number of cylinders, transmission type, number of doors, identification number, and brake type to supplement the vehicle identification information; and comparing the at least one of engine displacement volume, number of cylinders, transmission type, number of doors, identification number, and brake type to automotive core descriptions and automotive interchange numbers and core supplier identification indicators that correspond to the vehicle identification information to further identify the automotive core.

19. The computer readable storage media of claim 15, wherein the vehicle identification information includes a list of vehicle identifiers to process multiple vehicles simultaneously.

20. The computer readable storage media of claim 19, wherein the list of vehicle identifiers includes at least one of an electronic VIN number or a bar code with which to process multiple vehicles simultaneously.

\* \* \* \* \*